US012494723B2

(12) United States Patent
Ono et al.

(10) Patent No.: US 12,494,723 B2
(45) Date of Patent: Dec. 9, 2025

(54) CLUTCH CONTROL APPARATUS

(71) Applicant: HONDA MOTOR CO., LTD., Tokyo (JP)

(72) Inventors: Junya Ono, Tokyo (JP); Tatsuya Ryuzaki, Tokyo (JP); Satoshi Kajiro, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 18/283,010

(22) PCT Filed: Mar. 9, 2022

(86) PCT No.: PCT/JP2022/010340
§ 371 (c)(1),
(2) Date: Sep. 20, 2023

(87) PCT Pub. No.: WO2022/209670
PCT Pub. Date: Oct. 6, 2022

(65) Prior Publication Data
US 2024/0313673 A1    Sep. 19, 2024

(30) Foreign Application Priority Data

Mar. 31, 2021    (JP) .................. 2021-062010

(51) Int. Cl.
*H02P 5/74* (2006.01)
*F16D 28/00* (2006.01)
*F16D 48/06* (2006.01)

(52) U.S. Cl.
CPC ............... *H02P 5/74* (2013.01); *F16D 28/00* (2013.01); *F16D 48/064* (2013.01); *F16D 2500/1023* (2013.01); *F16D 2500/302* (2013.01)

(58) Field of Classification Search
CPC .. H02P 5/74; H02P 5/747; H02P 29/60; F16D 28/00; F16D 48/064; F16D 2500/1023; F16D 2500/302; F16D 48/06
(Continued)

(56) References Cited

U.S. PATENT DOCUMENTS 6,837,217 B1    1/2005  Hoshino et al.
7,466,086 B2 *  12/2008 Kiuchi ................... H02P 5/747
                                                    318/52
(Continued)

FOREIGN PATENT DOCUMENTS

JP    63-501588    6/1988
JP    04-302717    10/1992
(Continued)

OTHER PUBLICATIONS

International Search Report and Written Opinion for International Application No. PCT/JP2022/010340 mailed on May 24, 2022, 10 pages.

*Primary Examiner* — David Luo
(74) *Attorney, Agent, or Firm* — Amin, Turocy & Watson, LLP

(57) ABSTRACT

This clutch control apparatus includes: a clutch device; a clutch actuator; and a control unit, wherein the clutch actuator includes a plurality of electric motors and a transmission mechanism, wherein the plurality of electric motors are able to input a driving force to a common transmission element of the transmission mechanism, wherein the control unit detects at least one resistance value of the plurality of electric motors without driving a common transmission element by reversely driving a part of the plurality of electric motors and remaining electric motors, and wherein the control unit estimates a motor temperature from the resis-
(Continued)

tance value and controls the driving of the plurality of electric motors according to the motor temperature.

5 Claims, 18 Drawing Sheets

(58) Field of Classification Search
USPC .................................................. 318/45, 34
See application file for complete search history.

(56) References Cited

U.S. PATENT DOCUMENTS

| | | | |
|---|---|---|---|
| 8,219,290 B2* | 7/2012 | Ogawa | F16H 61/16 |
| | | | 701/55 |
| 10,050,569 B2* | 8/2018 | Harada | H02P 27/08 |

FOREIGN PATENT DOCUMENTS

| | | |
|---|---|---|
| JP | 2001-132779 | 5/2001 |
| JP | 2004-189067 | 7/2004 |
| WO | 87/02106 | 4/1987 |
| WO | 01/07768 | 2/2001 |

* cited by examiner

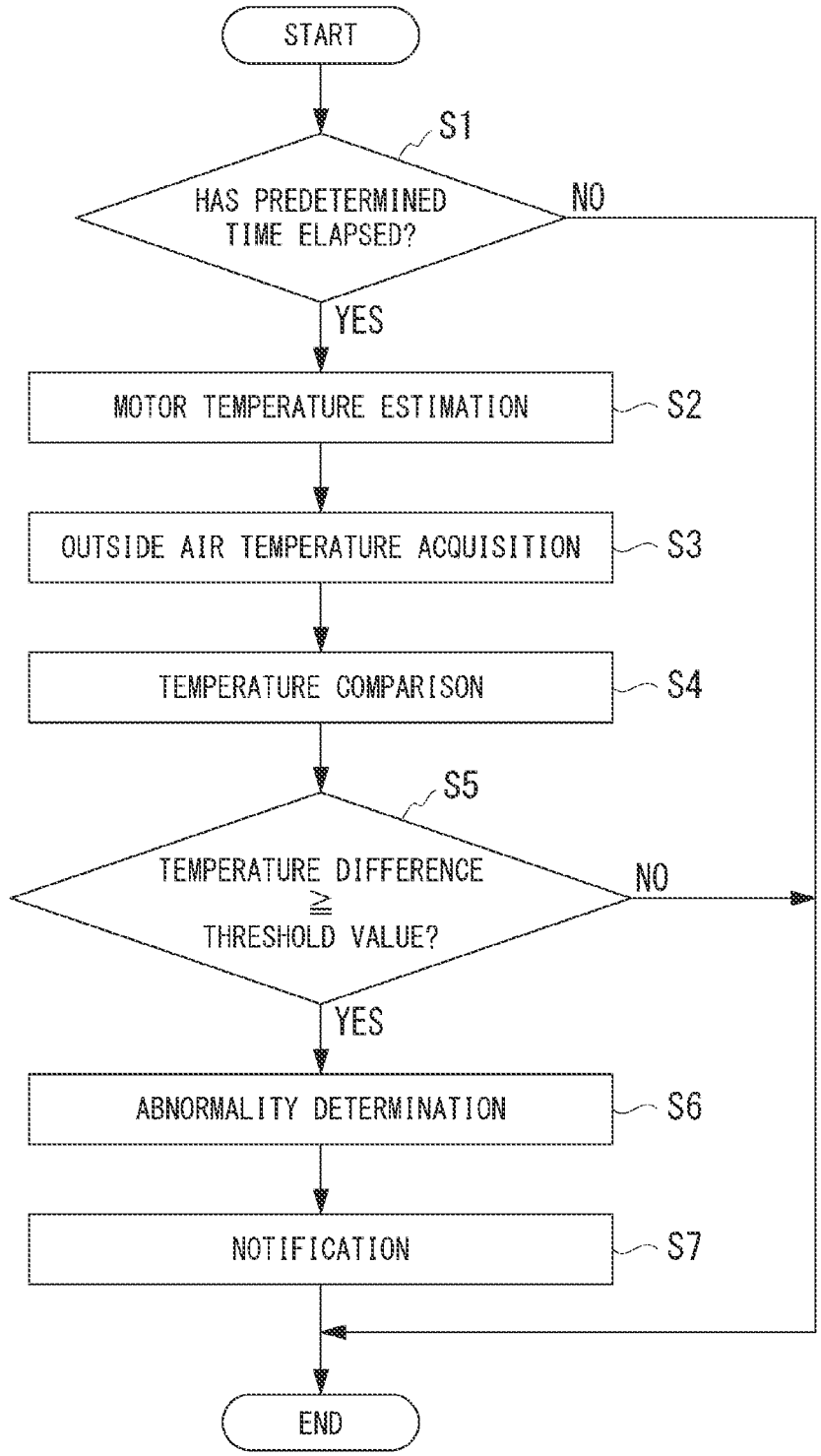

CLUTCH CONTROL APPARATUS

TECHNICAL FIELD

The present invention relates to a clutch control apparatus.

Priority is claimed on Japanese Patent Application No. 2021-062010, filed Mar. 31, 2021, the content of which is incorporated herein by reference.

BACKGROUND ART

Conventionally, in a clutch control apparatus, a configuration is known in which a temperature sensor is provided to detect a thermal load of a clutch and a clutch actuator is controlled according to information detected by the temperature sensor (for example, see Patent Document 1).

CITATION LIST

Patent Document

[Patent Document 1]
  Japanese Unexamined Patent Application, First Publication No. H4-302717

SUMMARY OF INVENTION

Technical Problem

Incidentally, in the above configuration, there is a problem that the cost of parts increases due to the temperature sensor for a dedicated purpose.

Here, an object of the present invention is to perform control according to a temperature while suppressing the cost of parts in a clutch control apparatus that controls the connection and disconnection of a clutch device.

Solution to Problem

For solving the above-described problems, a clutch control apparatus according to an aspect of the present invention includes: a clutch device (26) which enables and disables the transmission of power between a prime mover (13) and an output object (21); a clutch actuator (50) which outputs a driving force for operating the clutch device (26); and a control unit (40) which controls the driving of the clutch actuator (50), wherein the clutch actuator (50) includes a plurality of electric motors (521, 522) which output the driving force and a transmission mechanism (51) which is disposed between the plurality of electric motors (521, 522) and the clutch device (26), wherein the plurality of electric motors (521, 522) are able to input a driving force to a common transmission element in the transmission mechanism (51), wherein the control unit (40) detects at least one resistance value of the plurality of electric motors (521, 522) without driving a common transmission element by reversely driving a part of the plurality of electric motors (521, 522) and remaining electric motors, and wherein the control unit (40) estimates a motor temperature from the resistance value and controls the driving of the plurality of electric motors (521, 522) according to the motor temperature.

According to this configuration, since the temperature is estimated by detecting the resistance value of the drive source (electric motor) of the clutch actuator, the following effects can be obtained compared to the case of providing a separate temperature sensor. That is, it is possible to control the motor according to the motor temperature while keeping down the cost of parts. Therefore, it is possible to realize appropriate clutch control in consideration of the motor temperature. Further, since the resistance values are detected by mutually driving the plurality of electric motors in reverse, the transmission mechanism is not operated. Thus, the operating state of the clutch device is not affected. Therefore, it is possible to estimate the resistance value and the temperature of the electric motor at an arbitrary timing.

In the above-described aspect, the plurality of electric motors (521, 522) may be adjacent to each other.

According to this configuration, the resistance values of the plurality of electric motors arranged to be adjacent (close) to each other are detected. Accordingly, it is possible to more accurately estimate the motor temperature.

In the above-described aspect, an average value of the motor temperatures may be obtained based on the resistance values of the plurality of electric motors and the driving of the plurality of electric motors (521, 522) may be controlled according to the average value.

According to this configuration, the average value of the motor temperatures estimated from the resistance values of the electric motors is used. Therefore, it is possible to suppress the influence of temperature variations due to the individual differences and arrangement of the electric motors and to more accurately estimate the motor temperature.

In the above-described aspect, current values of the plurality of electric motors (521, 522) may be corrected according to the motor temperatures estimated from the resistance values.

According to this configuration, it is possible to perform appropriate motor control according to changes in motor temperature. That is, when the motor temperature increases, the resistance value increases and the magnetic force decreases. The current supplied to each of the electric motors is controlled according to this change. As a result, the driving performance of the electric motors can be kept satisfactory and appropriate clutch control can be realized.

In the above-described aspect, when the control unit (40) is started after being stopped for a predetermined time or more, the control unit (40) may detect at least one resistance value of the plurality of electric motors (521, 522) and estimate the motor temperature and the control unit (40) may compare the motor temperature with an outside air temperature detected by an outside air temperature sensor and determine that the outside air temperature sensor is abnormal if a temperature difference is equal to or larger than a predetermined threshold value.

According to this configuration, a failure of the outside air temperature sensor can be detected. This detection is made by using the fact that the motor temperature of the clutch actuator becomes equal to the outside air temperature after the clutch control system is stopped for a predetermined time. That is, when the system is started after a predetermined time has elapsed, the motor temperature is estimated and the outside air temperature is acquired from the outside air temperature sensor. A failure of the outside air temperature sensor can be detected by comparing the motor temperature and the outside air temperature.

Advantageous Effects of Invention

According to the present invention, it is possible to perform control according to a temperature while suppressing the cost of parts in a clutch control apparatus that controls the connection and disconnection of a clutch device.

BRIEF DESCRIPTION OF DRAWINGS

FIG. 19 is a flowchart showing a process for detecting abnormality of an outside air temperature sensor using estimation of a motor temperature.

DESCRIPTION OF EMBODIMENTS

Figure 1:
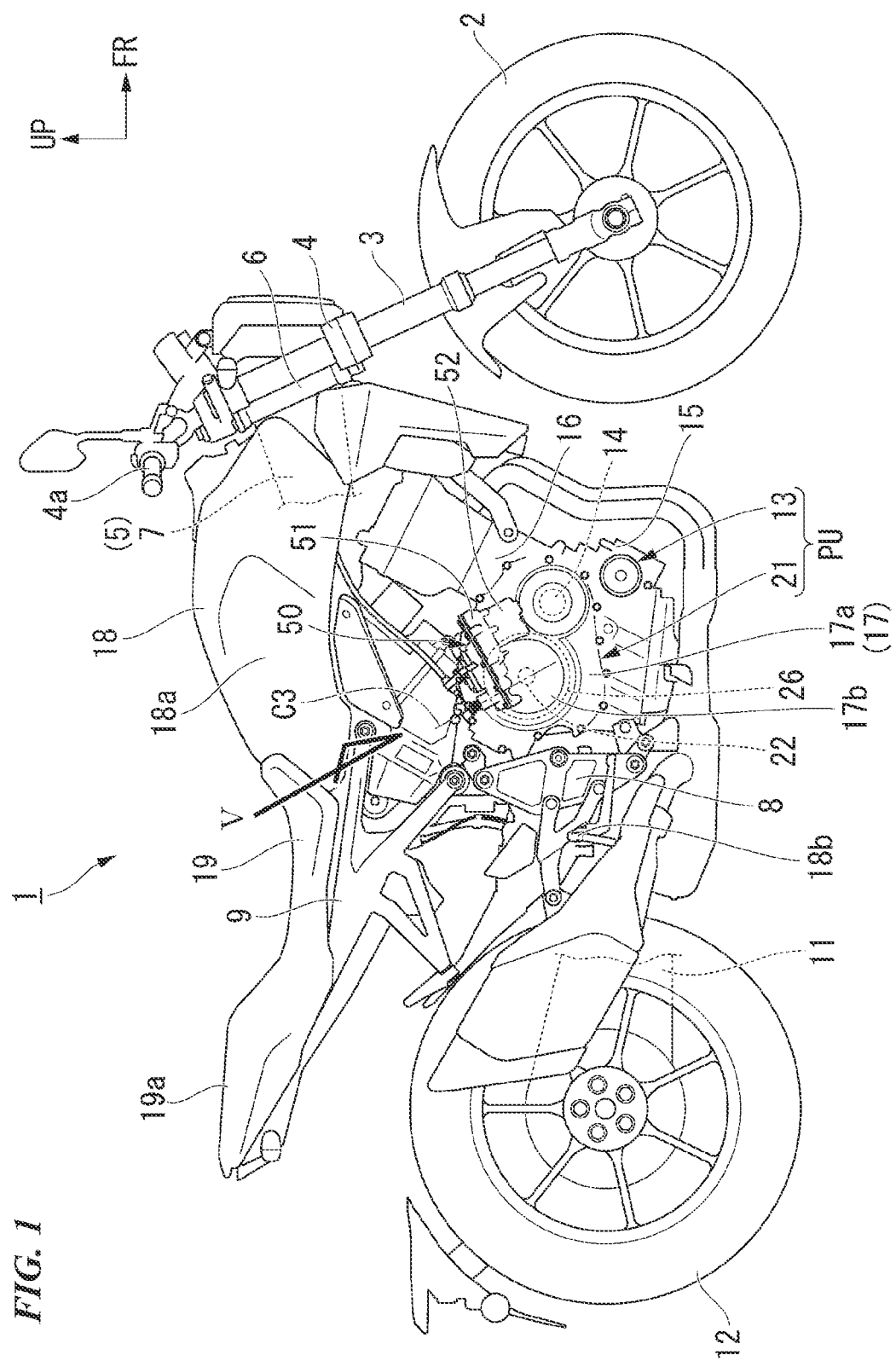
FIG. 1 is a right side view of a motorcycle of this embodiment.

Hereinafter, embodiments of the present invention will be described with reference to the drawings. Further, the directions such as front, back, left, and right in the following description are the same as the directions of the vehicle described below unless otherwise specified. An arrow FR indicating the front side of the vehicle, an arrow LH indicating the left side of the vehicle, and an arrow UP indicating the upper side of the vehicle are shown at appropriate locations in the drawings used in the following description.

<Whole Vehicle>

As shown in FIG. 1, this embodiment is applied to a motorcycle 1 as an example of a saddle type vehicle. A front wheel 2 of the motorcycle 1 is supported by lower end portions of a pair of left and right front forks 3. Upper portions of the left and right front forks 3 are supported by a head pipe 6 at a front end portion of a vehicle body frame 5 via a steering stem 4. A bar type steering handle 4a is attached onto a top bridge of the steering stem 4.

The vehicle body frame 5 includes the head pipe 6, a main frame 7 which extends downward and backward from the head pipe 6 at the center in the vehicle width direction (left and right direction), a pivot frame 8 which is provided below the rear end portion of the main frame 7, and a seat frame 9 which is connected to the rear side of the main frame 7 and the pivot frame 8. A front end portion of a swing arm 11 is swingably supported on the pivot frame 8. A rear wheel 12 of the motorcycle 1 is supported on a rear end portion of the swing arm 11.

A fuel tank 18 is supported above the left and right main frames 7. A front seat 19 and a rear seat 19a are supported behind the fuel tank 18 and above the seat frame 9. Knee grip portions 18a which are recessed inward in the vehicle width direction are formed on both left and right sides of the fuel tank 18. The left and right knee grip portions 18a are formed to match the following parts. The part is on the inner side around the left and right knees of the driver seated on the front seat 19. Steps 18b are supported on both left and right sides below the front seat 19. The driver puts his/her front foot from the ankle onto the step 18b.

A power unit PU including a prime mover of the motorcycle 1 is suspended below the main frame 7. The power unit PU integrally includes an engine (internal combustion engine, prime mover) 13 located on the front side and a transmission 21 located on the rear side. The engine 13 is, for example, a multi-cylinder engine in which a rotation axis of a crankshaft 14 is aligned in the left and right direction (vehicle width direction).

The engine 13 has a cylinder 16 erected above a front portion of a crankcase 15. A rear portion of the crankcase 15 is a transmission case 17 that accommodates the transmission 21. A right cover 17a extending over the right side of the transmission case 17 is attached to the right side portion of the crankcase 15. The right cover 17a also serves as a clutch cover that covers a clutch device 26. The power unit PU is linked to the rear wheel 12 via, for example, a chain type transmission mechanism (not shown).

<Transmission>

Figure 2:
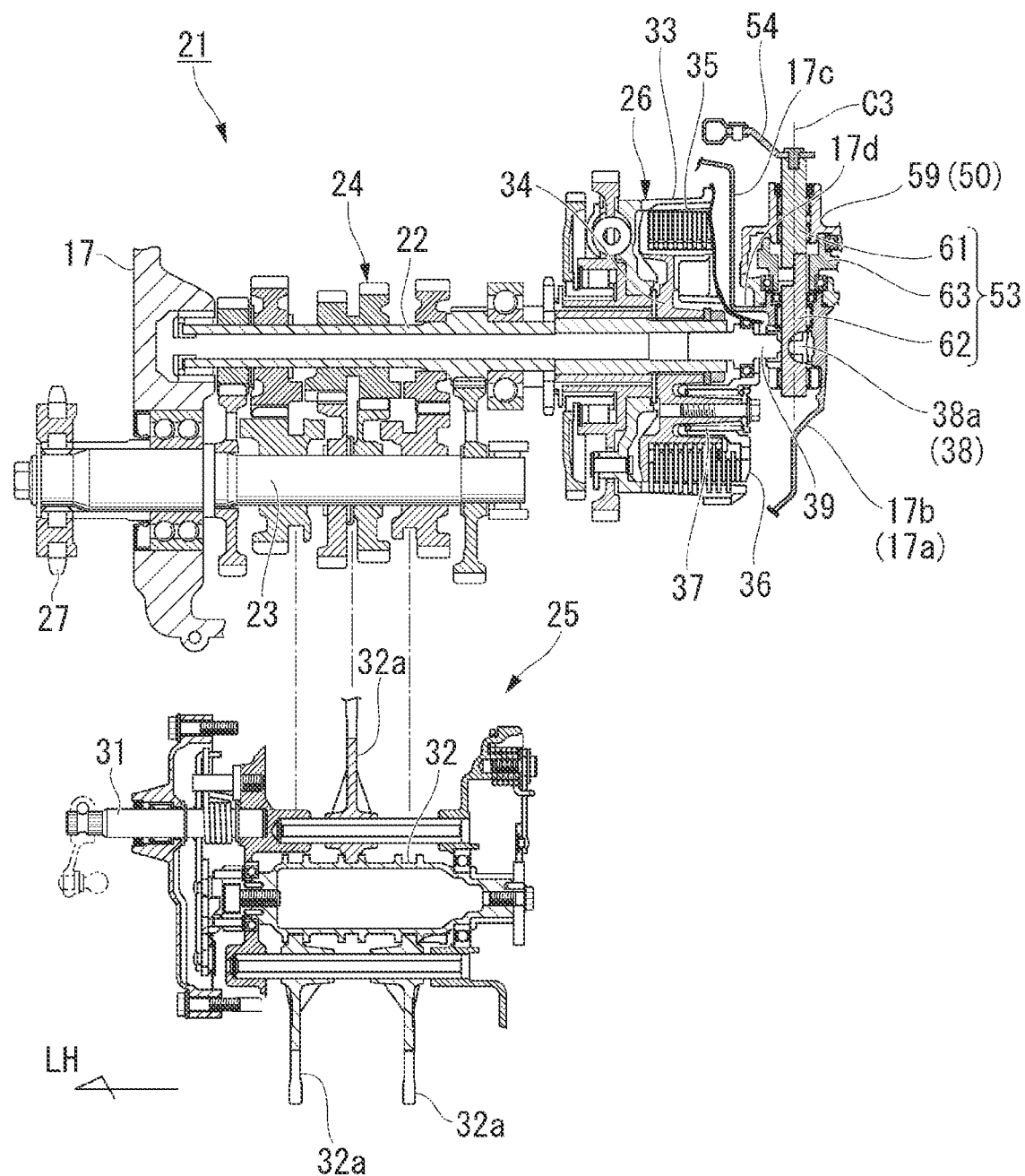
FIG. 2 is a cross-sectional view of a transmission and a change mechanism of the motorcycle.

Also referring to FIG. 2, the transmission 21 is a stepped transmission. The transmission 21 includes a main shaft 22, a counter shaft 23, and a transmission gear group 24 straddling both shafts 22 and 23. The counter shaft 23 constitutes the output shaft of the transmission 21 and the power unit PU. A left end portion of the countershaft 23 protrudes to the rear left side of the transmission case 17 and is connected to the rear wheel 12 via a chain type transmission mechanism.

The main shaft 22 and the counter shaft 23 of the transmission 21 are arranged behind the crankshaft 14. The clutch device 26 is coaxially disposed on a right end portion of the main shaft 22. The clutch device 26 enables and disables the transmission of power between the crankshaft 14 of the engine 13 and the main shaft 22 of the transmission 21. The clutch device 26 is connected and disconnected by at least one of the operation of a clutch operator (for example, a clutch lever (not shown)) by the passenger and the operation of a clutch actuator 50 which will be described in detail later.

The clutch device 26 is, for example, a wet multi-plate clutch which is a so-called normally closed clutch. The rotational power of the crankshaft 14 is transmitted to the main shaft 22 via the clutch device 26 and is transmitted from the main shaft 22 to the counter shaft 23 via an arbitrary gear pair of the transmission gear group 24. A drive sprocket 27 of the chain type transmission mechanism is attached to a left end portion of the counter shaft 23 that protrudes to the rear left side of the crankcase 15.

A change mechanism 25 for switching the gear pair of the transmission gear group 24 is accommodated in the vicinity of the transmission 21 inside the transmission case 17. The change mechanism 25 includes a hollow cylindrical shift drum 32 parallel to both shafts 22 and 23. By rotating this shift drum 32, the change mechanism 25 operates a plurality of shift forks 32a. This operation is performed according to the pattern of the lead grooves formed on the outer periphery of the shift drum 32. By this operation, the change mechanism 25 switches the gear pair used for the transmission of power between the shafts 22 and 23 in the transmission gear group 24.

Here, in the motorcycle 1, only the shift operation of the transmission 21 (foot operation of a shift pedal (not shown)) is performed by the driver and the connection/disconnection operation of the clutch device 26 is automatically performed by the electric control according to the operation of the shift pedal. That is, the motorcycle 1 employs a so-called semi-automatic transmission system (automatic clutch type transmission system).

<Transmission System>

Figure 3:
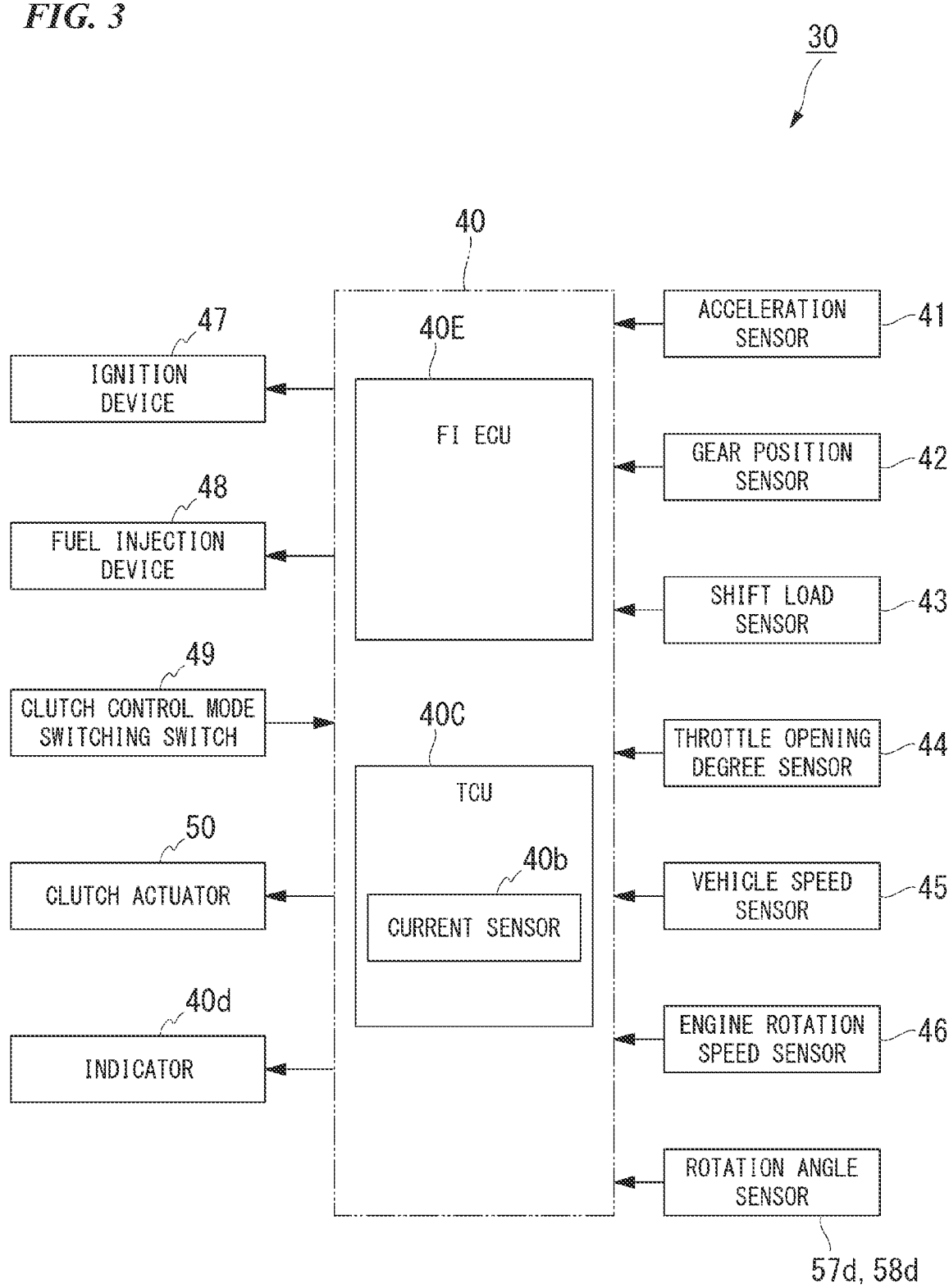
FIG. 3 is a block diagram of a transmission system of the motorcycle.

As shown in FIG. 3, the transmission system 30 includes the clutch actuator 50, a control unit 40, various sensors 41 to 46, 57d, and 58d, and various devices 47, 48, and 50.

The control unit 40 controls the operation of the ignition device 47 and the fuel injection device 48 and controls the operation of the clutch actuator 50. This control is based on detection information from the acceleration sensor 41, the gear position sensor 42, and the shift load sensor 43 (for example, the torque sensor) and various vehicle state detection information from the throttle opening degree sensor 44, the vehicle speed sensor 45, and the engine rotation speed sensor 46.

The acceleration sensor 41 detects the behavior of the vehicle body. The gear position sensor 42 detects a gear position from the rotation angle of the shift drum 32. The shift load sensor 43 detects the operating torque input to a shift spindle 31 (see FIG. 2) of the change mechanism 25. The throttle opening degree sensor 44 detects a throttle opening degree. The vehicle speed sensor 45 detects a vehicle speed. The engine rotation speed sensor 46 detects an engine rotation speed.

The process of the control unit 40 is repeatedly performed at a predetermined cycle when the power is turned on (the main switch of the motorcycle 1 is turned on).

The control unit 40 includes a clutch control unit 40C and an engine control unit 40E which are independent of each other. The clutch control unit 40C mainly controls the driving of the clutch actuator 50. The engine control unit 40E mainly controls the driving of the engine 13. The clutch control unit 40C and the engine control unit 40E are configured as, for example, separate electronic control units (ECUs). The clutch control unit 40C and the engine control unit 40E may be configured in an integrated ECU as long as they perform independent control.

Figure 5:
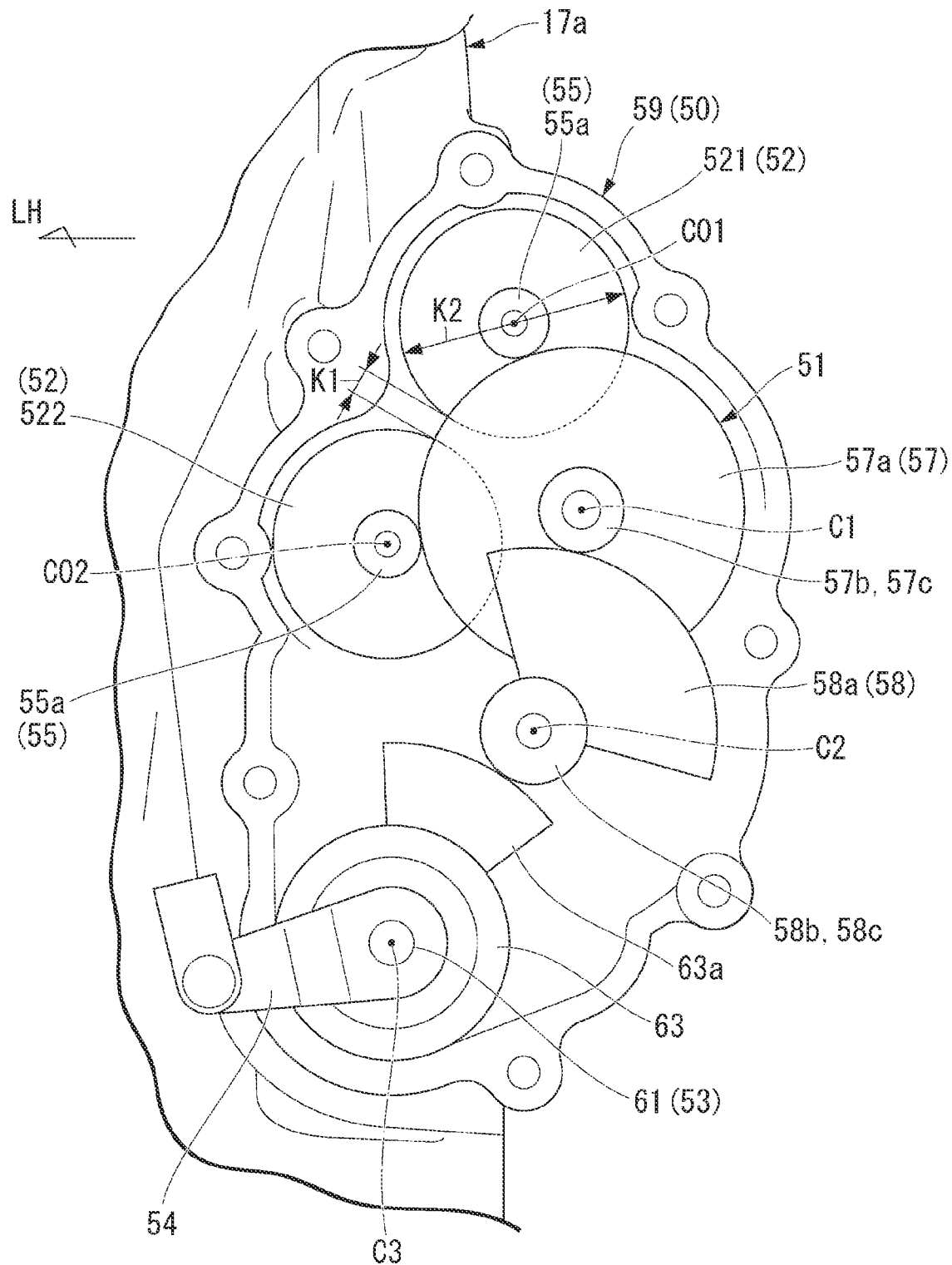
FIG. 5 is a view in the direction of an arrow V in FIG. 1 and shows a clutch actuator when viewed from an axial direction.
Figure 6:
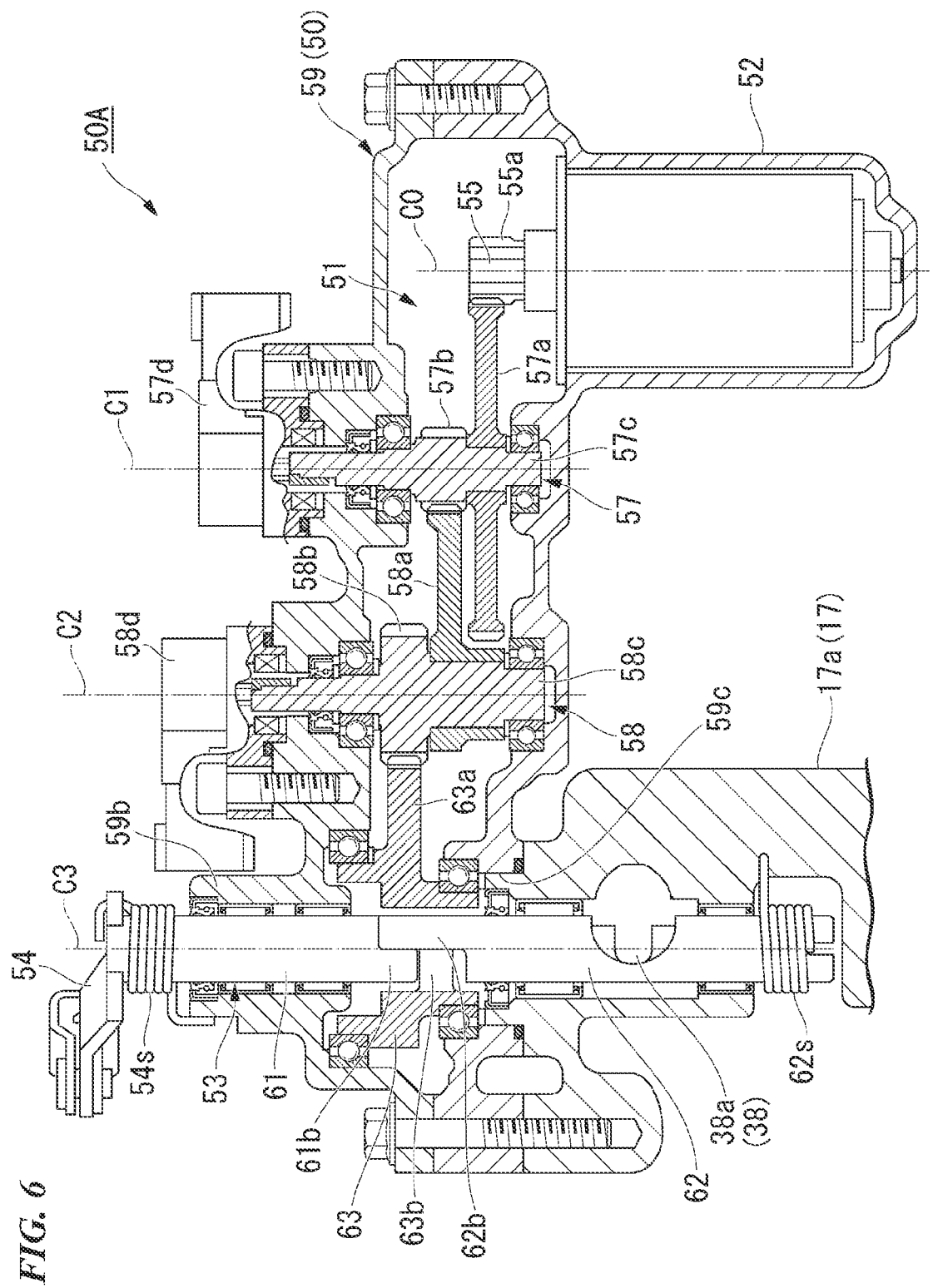
FIG. 6 is a developed cross-sectional view along the axial direction of the clutch actuator.

Also referring to FIGS. 5 and 6, the clutch actuator 50 controls the operating torque applied to a release shaft 53 in order to connect and disconnect the clutch device 26. The clutch actuator 50 includes an electric motor 52 (hereinafter, simply referred to as the motor 52) serving as a drive source and a speed reduction mechanism (transmission mechanism) 51 that transmits the driving force of the motor 52 to the release shaft 53. The speed reduction mechanism 51 includes a first reduction shaft 57 and a second reduction shaft 58. These shafts 57 and 58 are respectively provided with a first rotation angle sensor 57d and a second rotation angle sensor 58d for detecting rotation angles.

The clutch control unit 40C calculates the following current values based on a predetermined calculation program. The current value is the value of the current supplied to the motor 52 to connect and disconnect the clutch device 26. The current supplied to the motor 52 is obtained from the correlation with the torque to be output by the motor 52. The target torque of the motor 52 is proportional to the operating torque applied to the release shaft 53 (driven clutch lever torque which will be described later). The current value supplied to the motor 52 is detected by a current sensor 40b included in the clutch control unit 40C. The operation of the clutch actuator 50 is controlled according to a change in the detected value. The clutch actuator 50 will be described in detail later.

<Clutch Device>

Figure 11:
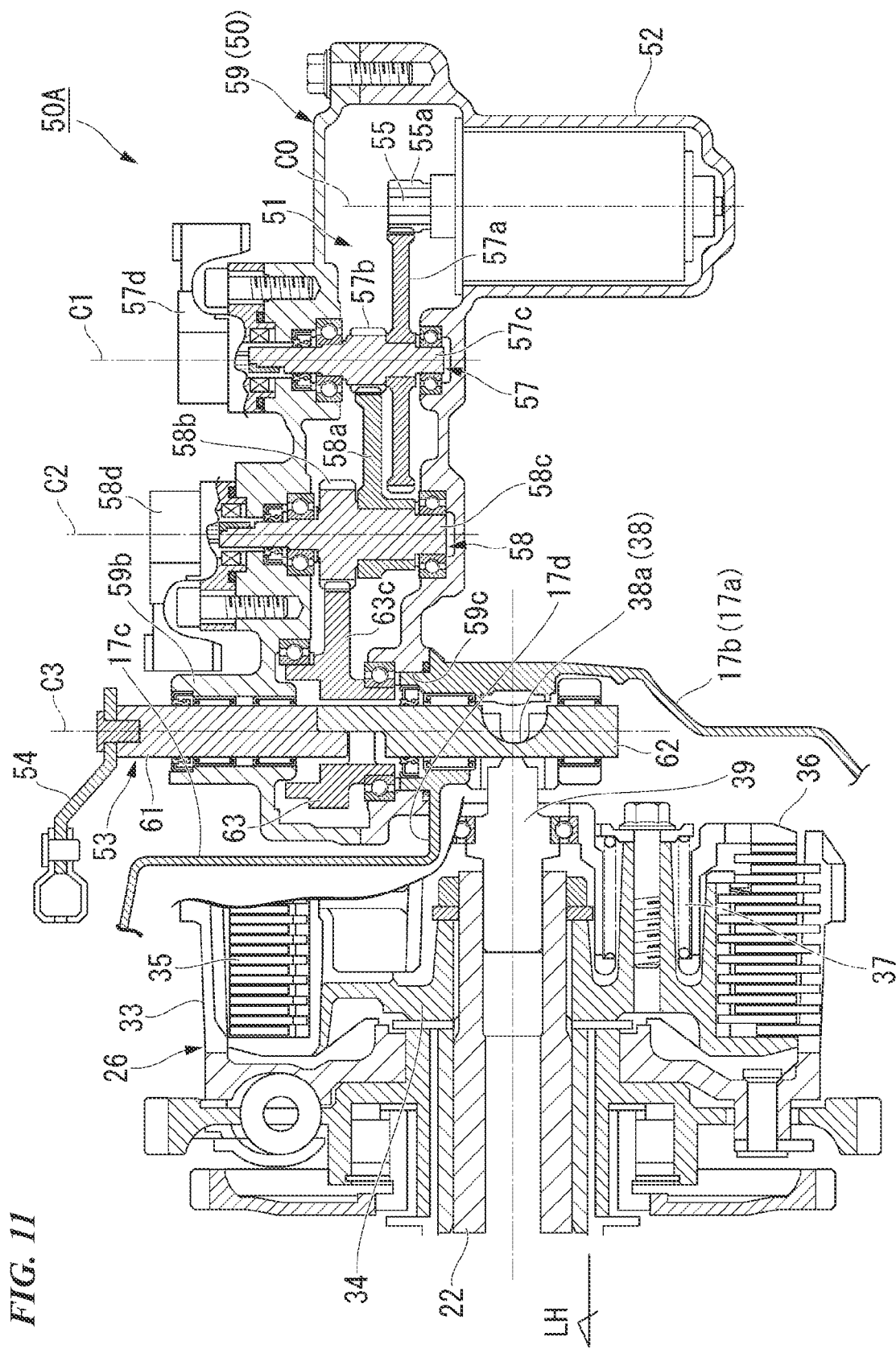
FIG. 11 is a cross-sectional view corresponding to FIG. 6 showing the clutch actuator attached to a right cover.

As shown in FIGS. 2 and 11, the clutch device 26 of the embodiment is a multi-plate clutch in which the plurality of clutch plates 35 are laminated in the axial direction and is a wet clutch disposed in an oil chamber inside the right cover 17a. The clutch device 26 includes a clutch outer 33, a clutch center 34, and a plurality of clutch plates 35.

The clutch outer 33 is driven by the rotational power normally transmitted from the crankshaft 14. The clutch center 34 is disposed inside the clutch outer 33 and is supported by the main shaft 22 to be integrally rotatable. The plurality of clutch plates 35 are laminated between the clutch outer 33 and the clutch center 34 to frictionally engage them.

A pressure plate 36 having substantially the same diameter as that of the clutch plate 35 is disposed on the right side (outside in the vehicle width direction) of the laminated clutch plates 35. The pressure plate 36 receives an elastic load of a clutch spring 37 and is urged leftward to bring the laminated clutch plates 35 in a pressure contact state (frictional engagement state). Accordingly, the clutch device 26 enters a connected state in which power can be transmitted. The clutch device 26 is a normally closed clutch that is normally connected when there is no external input.

The pressure contact (frictional engagement) is released by operating a release mechanism 38 inside the right cover 17a. The release mechanism 38 is operated by at least one of the operation of a clutch lever (not shown) by the passenger and the application of torque by the clutch actuator 50.

<Release Mechanism>

As shown in FIGS. 2 and 11, the release mechanism 38 includes a lifter shaft 39 and the release shaft 53.

The lifter shaft 39 is axially and reciprocally held within the right side portion of the main shaft 22. The release shaft 53 is disposed so that its axial direction is perpendicular to the lifter shaft 39 and is held on the outer side of the right cover 17a to be rotatable about its axis.

A line C3 in the drawing indicates the center axis of the release shaft 53 extending in the up and down direction. The release shaft 53 is tilted backward in the axial direction (see FIG. 1) so that the release shaft 53 is positioned backward as it goes upward in the vertical direction when viewed in the axial direction of the main shaft 22 (the side view of the vehicle). An upper portion of the release shaft 53 protrudes toward the outside of the right cover 17a and a driven clutch lever 54 is attached to the upper portion of the release shaft 53 to be integrally rotatable. The driven clutch lever 54 is connected to the clutch lever via an operation cable (not shown).

An eccentric cam portion 38a is provided on a lower portion of the release shaft 53 located inside the right cover 17a. The eccentric cam portion 38a engages with a right end portion of the lifter shaft 39. The release shaft 53 rotates around its axis to move the lifter shaft 39 rightward by the action of the eccentric cam portion 38a. The lifter shaft 39 is adapted to reciprocate integrally with the pressure plate 36 of the clutch device 26. Thus, when the lifter shaft 39 moves rightward, the pressure plate 36 moves (lifts) rightward against the urging force of the clutch spring 37. Accordingly, the frictional engagement between the laminated clutch plates 35 is released. Accordingly, the normally closed clutch device 26 becomes a disconnected state in which power cannot be transmitted.

Additionally, the release mechanism 38 is not limited to the eccentric cam mechanism and may be provided with a rack and pinion, a feed screw, or the like. The mechanism that connects the clutch lever and the driven clutch lever 54 is not limited to the operation cable, and may be provided with a rod, a link, or the like.

<Clutch Control Mode>

Figure 4:
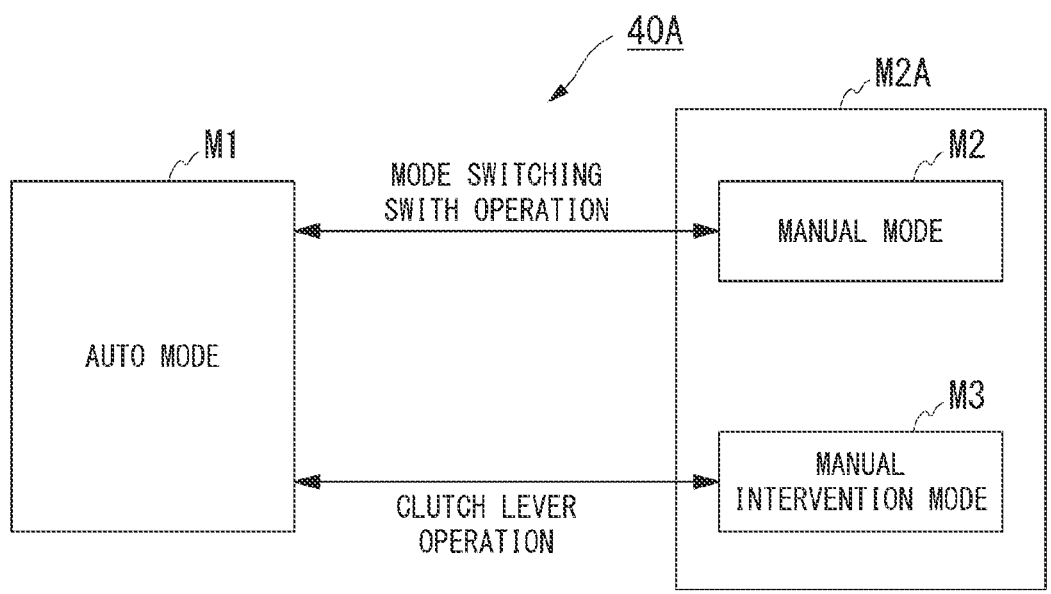
FIG. 4 is an explanatory diagram showing a transition of a clutch control mode of the motorcycle.

As shown in FIG. 4, the clutch control apparatus 40A of this embodiment has three clutch control modes. The clutch control mode has an auto mode M1 for automatic control, a manual mode M2 for manual operation, and a manual intervention mode M3 for temporary manual operation. The clutch control mode appropriately transitions between the three modes according to the operation of a clutch control mode switching switch 49 (see FIG. 3) and a clutch operator. Additionally, an object having the manual mode M2 and the manual intervention mode M3 is called a manual system M2A.

The auto mode M1 is a mode for controlling the clutch device 26 by calculating a clutch capacity suitable for the traveling state according to the automatic start/shift control. The manual mode M2 is a mode for controlling the clutch device 26 by calculating the clutch capacity according to the clutch operation instruction from the passenger. The manual intervention mode M3 is a mode for controlling the clutch device 26 by receiving the clutch operation instruction from the passenger during the auto mode M1 and calculating the clutch capacity from the clutch operation instruction and is a temporary manual operation mode. Additionally, for example, when the passenger stops operating the clutch operator (in a completely released state) for a specified period of time during the manual intervention mode M3, the mode may be set to return to the auto mode M1.

For example, when the system is started, the clutch control apparatus 40A starts control from the clutch-on state (connected state) in the auto mode M1. Further, the clutch control apparatus 40A is set to return to the clutch-on state in the auto mode M1 when the engine 13 is stopped (when the system is turned off). In the normally closed clutch device 26, the supply of power to the motor 52 of the clutch actuator 50 is not necessary when the clutch is turned on. On the other hand, the supply of power to the motor 52 is maintained in the clutch-off state (disconnected state) of the clutch device 26.

The auto mode M1 basically and automatically performs clutch control. The auto mode M1 enables the motorcycle 1 to travel without the lever operation. In the auto mode M1, the clutch capacity is controlled based on the throttle opening degree, engine speed, vehicle speed, shift sensor output, and the like. Accordingly, the motorcycle 1 can be started only by operating the throttle without causing an engine stall (meaning engine stop or engine stall). Further, the motorcycle 1 can be shifted only by a shift operation. Further, the auto mode M1 is switched to the manual intervention mode M3 when the passenger grips the clutch lever. Thereby, it is possible to arbitrarily disconnect the clutch device 26.

On the other hand, in the manual mode M2, the passenger can operate the lever to control the clutch capacity (that is, the clutch device 26 can be connected and disconnected). The auto mode M1 and the manual mode M2 are mutually switchable. This switching is performed, for example, by operating the clutch control mode switching switch 49 (see FIG. 3) while the motorcycle 1 is stopped and the transmission 21 is in neutral. Additionally, the clutch control apparatus 40A may include an indicator that indicates the manual state when transitioning to the manual system M2A (manual mode M2 or manual intervention mode M3).

The manual mode M2 basically and manually performs clutch control. The manual mode M2 can control the clutch capacity according to the operating angle of the clutch lever (and further the operating angle of the driven clutch lever 54). Accordingly, it is possible to control the connection and disconnection of the clutch device 26 according to the intention of the passenger. Additionally, even in the manual mode M2, the clutch control can automatically intervene when the shift operation is performed without the clutch operation. Hereinafter, the operating angle of the driven clutch lever 54 will be referred to as the driven clutch lever operating angle.

In the auto mode M1, the clutch device 26 is automatically connected and disconnected by the clutch actuator 50. At this time, since the manual clutch operation is performed on the clutch lever, the manual operation can be temporarily intervened in the automatic control of the clutch device 26 (manual intervention mode M3).

<Manual Clutch Operation>

In the motorcycle 1 shown in FIG. 1, a clutch lever (not shown) serving as a clutch manual operator is attached to the base end side (the inside in the vehicle width direction) of the left grip of the steering handle 4a.

Also referring to FIG. 2, the clutch lever is connected to the driven clutch lever 54 attached to the release shaft 53 of the clutch device 26 via an operation cable (not shown). The driven clutch lever 54 is attached to the upper end portion of the release shaft 53 that protrudes upward from the right cover 17a to be integrally rotatable.

Further, for example, the clutch control mode switching switch 49 is provided on the handle switch attached to the steering handle 4a. Accordingly, it is possible to easily switch the clutch control mode during normal driving.

<Clutch Actuator>

As shown in FIG. 1, the clutch actuator 50 is attached to a rear upper portion of the right cover 17a on the right side of the crankcase 15.

Also referring to FIGS. 5 and 6, the clutch actuator 50 includes the motor 52 and the speed reduction mechanism 51.

The motor 52 is, for example, a DC motor and is disposed, for example, in parallel to the release shaft 53 in the axial direction. The motor 52 is disposed so that the drive shaft 55 protrudes upward. The speed reduction mechanism 51 transmits the driving force of the motor 52 to the release shaft 53.

In the embodiment, the plurality of (two) motors 52 are provided for a single clutch actuator 50. Hereinafter, the motor 52 which is located on the vehicle front side of the clutch actuator 50 is referred to as a first motor 521 and the motor 52 which is located on the vehicle rear side and the inner side in the vehicle width direction with respect to the first motor 521 is referred to as a second motor 522. Lines C01 and C02 in the drawing respectively indicate the center axes of the motors 521 and 522 (the drive axes). For convenience of description, both motors 521 and 522 may be collectively referred to as the motor 52. Also, both axes C01 and C02 may be collectively referred to as the axis C0.

The speed reduction mechanism 51 decelerates the rotational power output from the motor 52 and transmits the rotational power to the release shaft 53. The speed reduction mechanism 51 includes, for example, a gear train axially parallel to the release shaft 53. The speed reduction mechanism 51 includes a drive gear 55a, a first reduction gear 57a, a first small diameter gear 57b, a second reduction gear 58a, a second small diameter gear 58b, a driven gear 63a, and a gear case 59.

The drive gear 55a is provided integrally with the drive shaft 55 of each of the motors 521 and 522. The first reduction gear 57a meshes with each drive gear 55a. The first small diameter gear 57b is provided coaxially with the first reduction gear 57a. The second reduction gear 58a meshes with the first small diameter gear 57b. The second small diameter gear 58b is provided coaxially with the second reduction gear 58a. The driven gear 63a meshes with the second small diameter gear 58b. The gear case 59 accommodates each gear.

The first reduction gear 57a and the first small diameter gear 57b are supported by a first support shaft 57c to be integrally rotatable. The first reduction gear 57a, the first small diameter gear 57b, and the first support shaft 57c constitute the first reduction shaft 57. The second reduction gear 58a and the second small diameter gear 58b are supported by a second support shaft 58c to be integrally rotatable. The second reduction gear 58a, the second small diameter gear 58b, and the second support shaft 58c constitute the second reduction shaft 58. Each of the first support shaft 57c and the second support shaft 58c is rotatably supported by the gear case 59. The second reduction gear 58a is a sector gear centered on the second support shaft 58c. The second reduction gear 58a is provided to extend forward and outward in the vehicle width direction of the second support shaft 58c. In the drawing, a line C1 indicates the center axis of the first reduction shaft 57 and a line C2 indicates the center axis of the second reduction shaft 58.

The driven gear 63a is provided in the release shaft 53 to be integrally rotatable. The driven gear 63a is a sector gear centered on the release shaft 53. The driven gear 63a is provided to spread toward the front side of the release shaft 53. A gear on the downstream side of the speed reduction mechanism 51 has a small rotation angle. Therefore, the second reduction gear 58a and the driven gear 63a can be sector gears with a small rotation angle.

As a result, it is possible to reduce the size of the speed reduction mechanism 51 and further the clutch actuator 50. That is, even when a large diameter reduction gear is provided in order to increase the reduction ratio, the following effects can be obtained by cutting out portions other than the meshing range of the reduction gear to form a fan shape. That is, in particular, it is possible to suppress the speed reduction mechanism 51 from projecting outward in the vehicle width direction and to reduce the weight of the speed reduction mechanism 51.

With such a configuration, the motor 52 and the release shaft 53 can always be interlocked via the speed reduction mechanism 51. Accordingly, a system is configured in which the clutch actuator 50 directly connects and disconnects the clutch device 26.

Each gear is a flat spur gear with a reduced thickness in the axial direction and the gear case 59 is also formed in a flat shape with a reduced thickness in the axial direction. Accordingly, the speed reduction mechanism 51 is less noticeable when viewed from the side of the vehicle. The first rotation angle sensor 57d and the second rotation angle sensor 58d are provided on the upper surface side of the gear case 59. The first rotation angle sensor 57d and the second rotation angle sensor 58d are respectively connected to one end portions of the first reduction shaft 57 and the second reduction shaft 58 to detect these rotation angles.

The motor 52 is disposed to protrude downward from the front portion of the gear case 59. Accordingly, the motor 52 can be disposed as follows. That is, it is possible to dispose the right cover 17a to avoid a bulging portion 17b covering the clutch device 26 in the front direction. Therefore, the projection of the clutch actuator 50 toward the outside in the vehicle width direction is suppressed.

The driving force of the motor 52 is decelerated as follows and is transmitted to the release shaft 53. That is, the driving force of the motor 52 is decelerated between the drive gear 55a and the first reduction gear 57a, is decelerated between the first small diameter gear 57b and the second reduction gear 58a, and is further decelerated between the second small diameter gear 58b and the driven gear 63a.

<Arrangement of Clutch Actuator>

Figure 15:
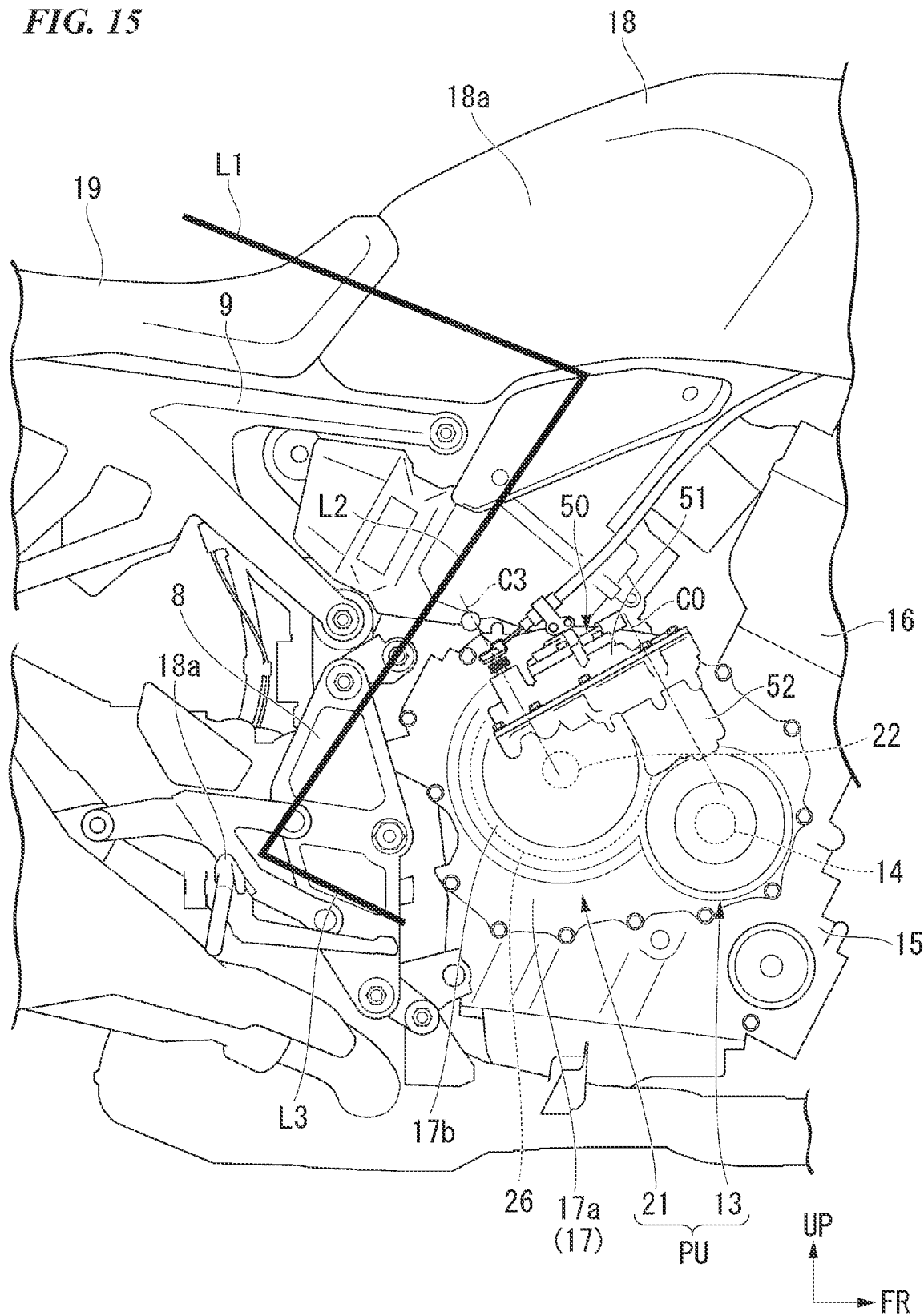
FIG. 15 is a right side view showing a main part of the motorcycle.
Figure 16:
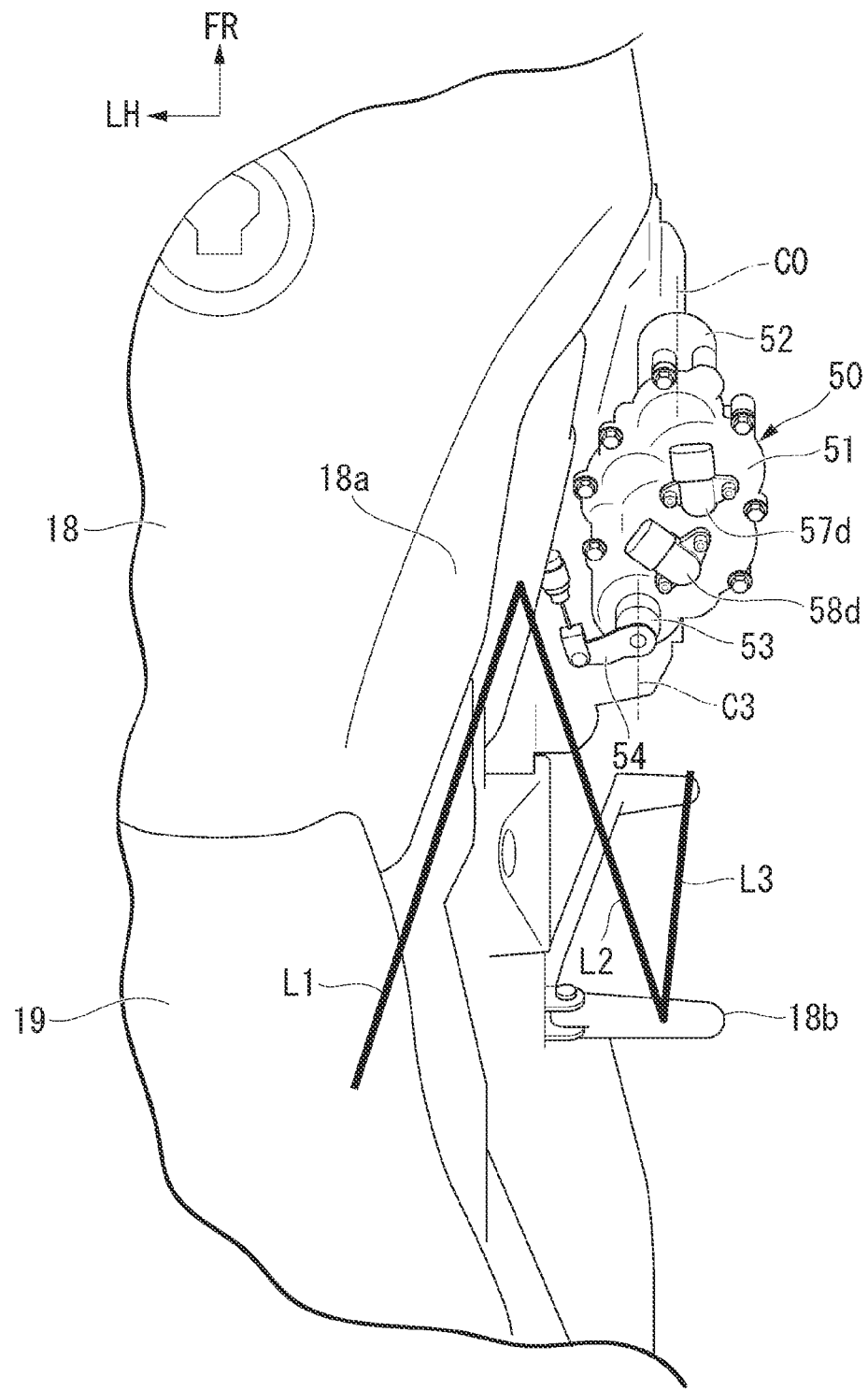
FIG. 16 is a plan view showing a main part of the motorcycle.
Figure 17:
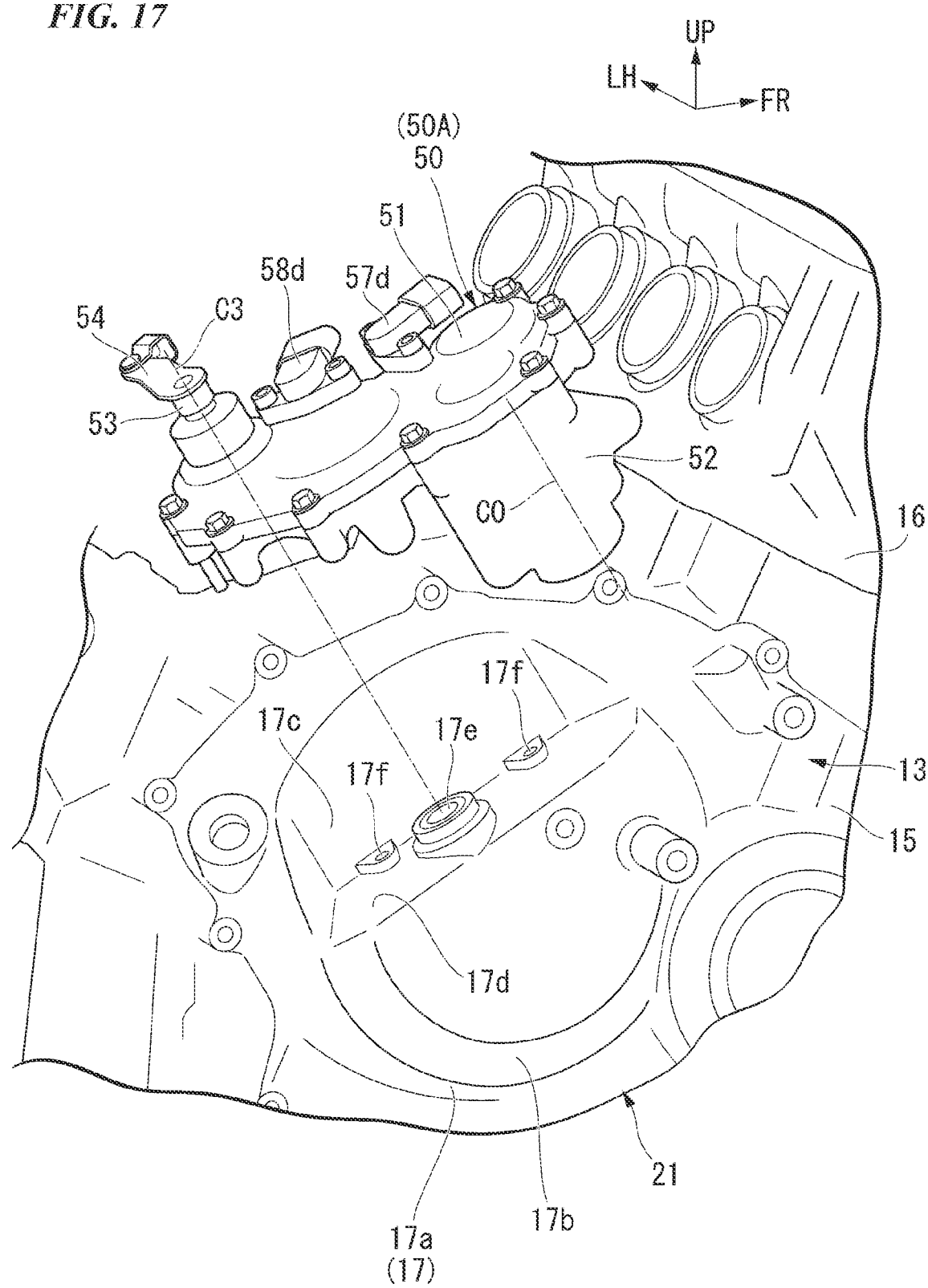
FIG. 17 is an exploded perspective view showing a main part of the motorcycle.

As shown in FIGS. 15 to 17, the clutch actuator 50 is disposed vertically below the knee grip portion 18a on the right side of the fuel tank 18 when viewed from the side of the vehicle. The clutch actuator 50 is disposed to protrude outward in the vehicle width direction from the knee grip portion 18a on the right side of the fuel tank 18 when viewed from the top of FIG. 16. In the drawing, a line L1 indicates the thigh of the leg of the driver, a line L2 indicates the lower leg below the knee, and a line L3 indicates the front foot from the ankle.

As for the legs of the driver, the lower leg L2 is extended obliquely backward and downward from the knee grip portion 18a and the foot L3 is placed on the step 18b when viewed from the side of the vehicle. The clutch actuator 50 projects outward in the vehicle width direction from the knee grip portion 18a. The clutch actuator 50 is disposed to avoid the lower leg L2 of the leg of the driver when viewed from the side of the vehicle. Accordingly, the interference of the clutch actuator 50 with the arrangement space of the legs of the driver is suppressed. The clutch actuator 50 is disposed at a forward position avoiding the lower leg L2 of the leg of the driver when viewed from the side of the vehicle even when the driver extends the leg and lands the foot L3. Even in this regard, the interference of the clutch actuator 50 with the arrangement space of the legs of the driver is suppressed.

Referring to FIG. 17, the right cover 17a has a bulging portion 17b that bulges outward in the vehicle width direction in the following range. The range is a circular range coaxial with the clutch device 26 when viewed from the side of the vehicle. A cover recess 17c is formed in a portion of the bulging portion 17b facing backward and upward. The cover recess 17c changes the outer surface inward in the vehicle width direction with respect to the remaining portion. The cover recess 17c has a semicircular shape when viewed from the side of the vehicle.

The semicircular chord portion of the cover recess 17c is formed in a straight line perpendicular to the axial direction of the release shaft 53 when viewed from the side of the vehicle. This chord portion forms a stepped portion 17d that changes the outer surface of the bulging portion 17b in a stepped manner. The stepped portion 17d is inclined backward and downward when viewed from the side of the vehicle. The upper portion of the release shaft 53 protrudes obliquely upward and backward from the stepped portion 17d. The release shaft 53 penetrates the stepped portion 17d of the cover recess 17c and protrudes toward the outside of the cover. The clutch actuator 50 is attached to the right cover 17a to be inserted into the cover recess 17c.

<Release Shaft>

Figure 7:
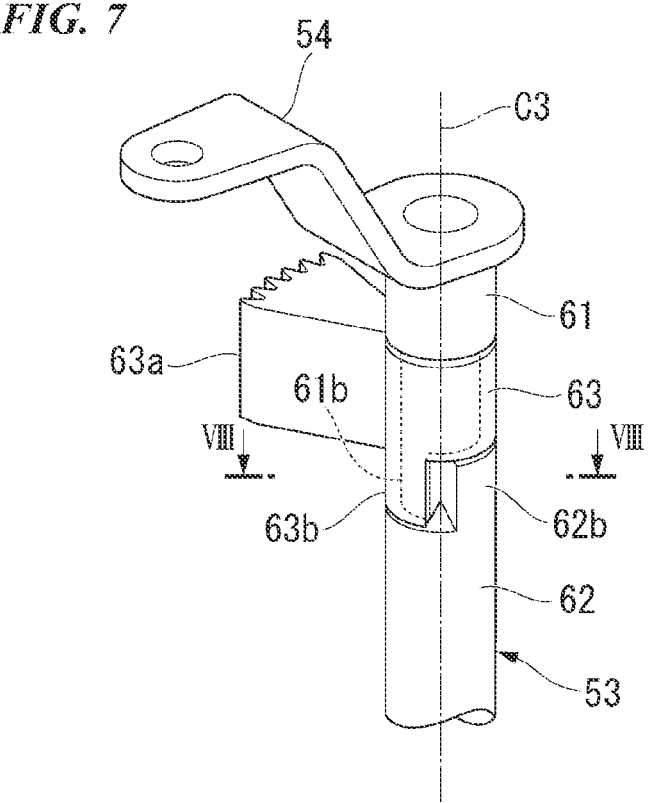
FIG. 7 is a perspective view of a release shaft that operates a clutch device.
Figure 8:
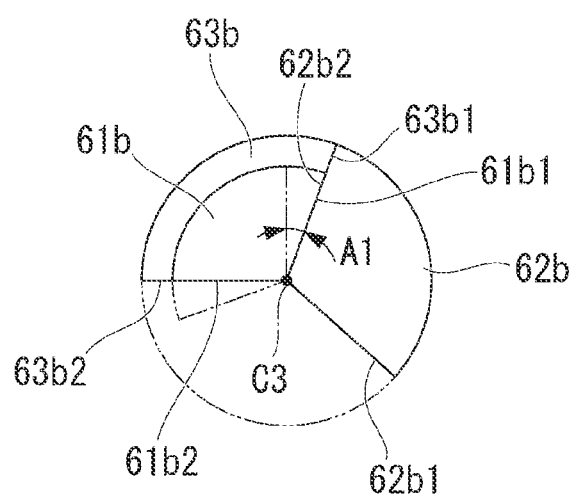
FIG. 8 is a cross-sectional view taken along a line VIII-VIII of FIG. 7.

As shown in FIGS. 6 to 8, the release shaft 53 is divided into a plurality of elements to be rotatable by separately receiving the input from the clutch actuator 50 and the input by the operation of the passenger.

The release shaft 53 includes an upper release shaft 61 which constitutes an upper portion, a lower release shaft 62 which constitutes a lower portion, and an intermediate release shaft 63. The intermediate release shaft 63 is disposed across the lower end portion of the upper release shaft 61 and the upper end portion of the lower release shaft 62.

The upper release shaft 61 has a columnar shape. The upper release shaft 61 is rotatably supported by an upper boss portion 59b of the gear case 59. The upper end portion of the upper release shaft 61 protrudes toward the outside of the gear case 59. The driven clutch lever 54 is supported by the upper end portion of the upper release shaft 61 to be integrally rotatable. A return spring 54s is attached to the driven clutch lever 54. The return spring 54s applies an urging force to the driven clutch lever 54 in a direction opposite to the rotation (the rotation in the clutch disconnection direction) due to the operation of the clutch operator.

The lower release shaft 62 has a columnar shape. The lower portion of the lower release shaft 62 is rotatably supported inside the right cover 17a. The lower portion of the lower release shaft 62 faces the inside of the gear case 59. This lower portion is provided with the eccentric cam portion 38a of the release mechanism 38. A lower return spring 62s is attached to the lower end portion of the lower release shaft 62. The lower return spring 62s applies an urging force to the lower release shaft 62 in a direction opposite to the rotation in the clutch disconnection direction.

The lower end portion of the upper release shaft 61 is provided with a manual operation side cam 61b which has a fan-shaped cross-section and extends in the axial direction.

The upper end portion of the lower release shaft 62 is provided with a clutch side cam 62b which has a fan-shaped cross-section and extends in the axial direction. The clutch side cam 62b is provided in a range that avoids the manual operation side cam 61b in the circumferential direction or the axial direction.

The lower end portion (the manual operation side cam 61b) of the upper release shaft 61 and the upper end portion (the clutch side cam 62b) of the lower release shaft 62 overlap each other in the axial direction while avoiding each other in the circumferential direction. Alternatively, the manual operation side cam 61b and the clutch side cam 62b overlap each other in the circumferential direction while avoiding each other in the axial direction. Accordingly, it is possible to rotate the lower release shaft 62 by pressing the other circumferential side surface 62b2 of the clutch side cam 62b at one circumferential side surface 61b1 of the manual operation side cam 61b (see FIGS. 9B and 10B).

The other circumferential side surface 61b2 of the manual operation side cam 61b and the one circumferential side surface 62b1 of the clutch side cam 62b are separated from each other in the circumferential direction or the axial direction. Accordingly, when the clutch side cam 62b receives an input from the clutch actuator 50, the lower release shaft 62 can rotate independently of the upper release shaft 61 (see FIGS. 9A and 10A).

The intermediate release shaft 63 has a cylindrical shape. The intermediate release shaft 63 can be inserted through an engagement portion (upper and lower shaft engagement portions) between the lower end portion of the upper release shaft 61 and the upper end portion of the lower release shaft 62. The driven gear 63a is supported by the intermediate release shaft 63 to be integrally rotatable.

The intermediate release shaft 63 is provided with a control operation side cam 63b which has a fan-shaped cross-section and extends in the axial direction.

The intermediate release shaft 63 and the driven gear 63a suppress the contact with other components of the clutch actuator 50. Specifically, the inner peripheral surface of the intermediate release shaft 63 only contacts the following parts other than the bearings supported by the gear case 59. These parts are the lower end portion (the manual operation side cam 61b) of the upper release shaft 61 and the upper end portion (the clutch side cam 62b) of the lower release shaft 62.

The control operation side cam 63b of the intermediate release shaft 63 engages with the following parts with a clearance in the axial direction. These parts are the manual operation side cam 61b of the upper release shaft 61 and the clutch side cam 62b of the lower release shaft 62.

Further, the driven gear 63a only brings the gear teeth into contact with the second small diameter gear 58b. Accordingly, the control accuracy of the release shaft 53 is improved by reducing the friction of the driven gear 63a which is a control gear as much as possible.

The control operation side cam 63b of the intermediate release shaft 63 and the clutch side cam 62b of the lower release shaft 62 overlap each other in the axial direction while avoiding each other in the circumferential direction. Alternatively, the control operation side cam 63b and the clutch side cam 62b overlap each other in the circumferential direction while avoiding each other in the axial direction. Accordingly, it is possible to rotate the lower release shaft 62 by pressing the other circumferential side surface 62b2 of the clutch side cam 62b at one circumferential side surface 63b1 of the control operation side cam 63b.

Further, the control operation side cam 63b is disposed to avoid the manual operation side cam 61b of the upper release shaft 61 in the axial direction or radial direction. Accordingly, the lower release shaft 62 can rotate independently of the upper release shaft 61 when transmitting an input from the clutch actuator 50 to the clutch side cam 62b. Further, when there is a manual operation, the upper release shaft 61 can rotate independently of the intermediate release shaft 63 on the control side.

The other circumferential side surface 63b2 of the control operation side cam 63b and the one circumferential side surface 62b1 of the clutch side cam 62b are separated from each other in the circumferential direction. Accordingly, when there is an input from the manual operation side cam 63b to the clutch side cam 62b, the lower release shaft 62 can rotate independently of the intermediate release shaft 63.

Referring to FIGS. 11 and 17, the clutch actuator 50 can rotatably hold the upper release shaft 61 and the intermediate release shaft 63 with the gear case 59. The clutch actuator 50 includes the upper release shaft 61 and the intermediate release shaft 63 to form an integrated actuator unit 50A.

The lower release shaft 62 is rotatably held by the right cover 17a. The stepped portion 17d of the cover recess 17c of the right cover 17a is provided with an opening portion 17e and is provided with a fastening portion 17f of the gear case 59. The upper end portion of the lower release shaft 62 protrudes from the opening portion 17e. An opening portion 59c is provided in a portion of the gear case 59 facing the stepped portion 17d of the cover recess 17c. The opening portion 59c allows the upper end portion of the lower release shaft 62 to face the inside of the gear case 59.

In such a configuration, the release shaft 53 having a linear shape is formed when the actuator unit 50A is attached to the right cover 17a. The release shaft 53 is formed by connecting the upper release shaft 61, the intermediate release shaft 63, and the lower release shaft 62.

The power unit PU of the embodiment can be configured as follows for a manual clutch type power unit in which the connection and disconnection operation of the clutch device 26 is not electrically controlled but is operated by the driver. That is, the power unit PU can be configured by replacing the right cover 17a and the release shaft 53 and retrofitting the actuator unit 50A. Therefore, the actuator unit 50A can be attached to power units of different models. Therefore, it is possible to easily configure a semi-automatic transmission system (automatic clutch type transmission system) by sharing the actuator unit 50A among many models.

<Clutch Control>

Figure 12:
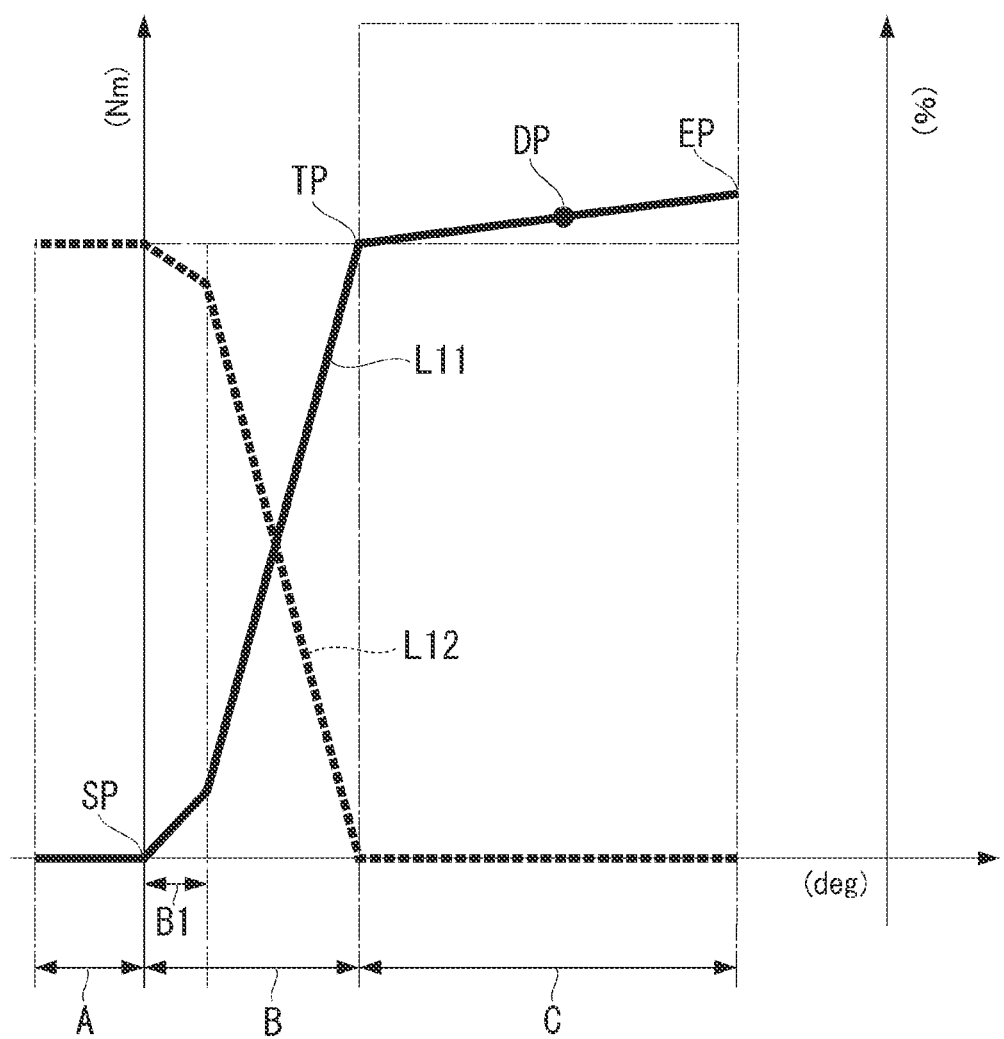
FIG. 12 is a graph showing clutch control characteristics, in which a vertical axis indicates an output value of the clutch actuator and a horizontal axis indicates an operation amount of a release mechanism.

Next, the clutch control of the embodiment will be described with reference to the graph of FIG. 12. The graph in FIG. 12 indicates the clutch characteristics in the auto mode M1. In the graph of FIG. 12, the vertical axis indicates the torque (Nm) and the clutch capacity (%) applied to the driven clutch lever 54 and the horizontal axis indicates the operating angle (deg) of the driven clutch lever 54. The operating angle of the driven clutch lever 54 is the operating angle of the lower release shaft 62.

The torque of the driven clutch lever 54 is the torque generated by the lower release shaft 62. This torque corresponds to a torque value calculated by multiplying the following primary torque value by the speed reduction ratio of the speed reduction mechanism 51. The primary torque value is obtained based on the current value supplied to the motor 52 from the correlation between the current supplied to the motor 52 and the torque generated by the motor 52.

Hereinafter, the torque of the driven clutch lever 54 is referred to as a driven clutch lever torque. A line L11 in the graph indicates the correlation between the driven clutch lever operating angle and the driven clutch lever torque. A line L12 in the graph indicates the correlation between the driven clutch lever operating angle and the clutch capacity. The line L11 is also a line indicating the output value (reference output value) of the clutch actuator 50 when the clutch device 26 is connected and disconnected without manual operation intervention.

In the auto mode M1 of the normally closed clutch, when the driven clutch lever torque (motor output) is "0", there is no operation input (disconnection side input) to the clutch device 26 and the clutch capacity becomes 100%. That is, the clutch device 26 maintains the connected state. This state corresponds to a region A on the horizontal axis of FIG. 12. The region A is a play region of the driven clutch lever 54.

In the region A, there is no motor output and the driven clutch lever torque remains "0". In the region A, there is no operation of the clutch device 26 and the clutch capacity remains at 100%.

Also referring to FIG. 8, in the region A, the one circumferential side surface 61b1 of the manual operation side cam 61b of the release shaft 53 does not press the other circumferential side surface 62b2 of the clutch side cam 62b. At this time, the manual operation side cam 61b is separated from the clutch side cam 62b by the urging force of the return spring 54s (indicated by the dashed line in FIG. 8). In the region A, the driven clutch lever 54 is in a play state in which the manual operation side cam 61b can move toward and away from the clutch side cam 62b by an angle A1 in the drawing. For example, in the region A, one circumferential side surface 63b1 of the control operation side cam 63b is in contact with the other circumferential side surface 62b2 of the clutch side cam 62b.

Referring to FIG. 12, when the driven clutch lever operating angle increases and passes the play region A, the driven clutch lever operating angle shifts to the half-clutch region B. In the half-clutch region B, the driven clutch lever torque starts increasing due to the operation of the motor 52.

Figure 9A:
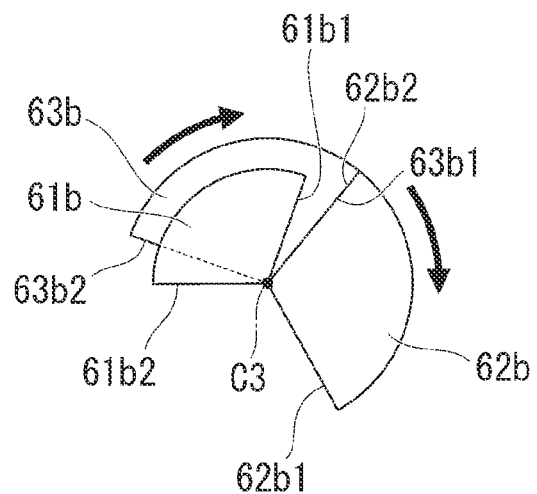
FIG. 9A is a cross-sectional view corresponding to FIG. 8 showing the action of the release shaft in a half-clutch region and shows a driving state in the clutch actuator.
Figure 9B:
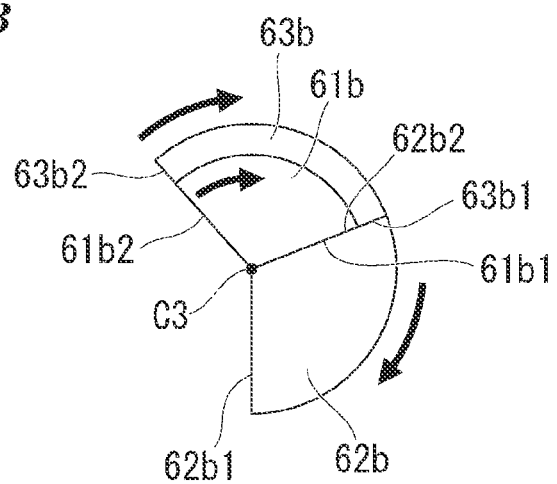
FIG. 9B is a cross-sectional view corresponding to FIG. 8 showing the action of the release shaft in the half-clutch region and shows a manual intervention state.

Also referring to FIG. 9A, the control operation side cam 63b presses the clutch side cam 62b to rotate the lower release shaft 62 in the half-clutch region B. When the driven clutch lever torque increases, the release mechanism 38 lifts the clutch device 26 to reduce the clutch capacity. That is, the clutch device 26 is in a half-clutch state in which partial power transmission is enabled. A symbol SP in FIG. 12 indicates the start position (operation start position) of the operation in which the play region A is switched to the half-clutch region B. When the manual operation intervenes in the half-clutch region B, the manual operation side cam 61b comes into contact with the clutch side cam 62b. At this time, the manual operation side cam 61b rotates the lower release shaft 62 in cooperation with the control operation side cam 63b (see FIG. 9B).

Referring to FIG. 12, the driven clutch lever torque sharply increases as the driven clutch lever operating angle increases in the half-clutch region B and thus the clutch device 26 is operated to the disconnection side. For example, there is an influence of clutch judder spring reaction force (not shown) at the beginning of the half-clutch region B. As a result, a deceleration region B1 is set in which an increase in the driven clutch lever torque with respect to an increase in the driven clutch lever operating angle is moderate at the beginning of the half-clutch region B.

In the half-clutch region B, the clutch capacity sharply decreases to be inversely proportional to an increase in the driven clutch lever torque as the driven clutch lever operating angle increases. In the deceleration region B1 at the beginning of the half-clutch region B, the clutch capacity decreases moderately as the driven clutch lever torque increases slowly.

When the driven clutch lever operating angle passes the touch point TP which is the end point of the half-clutch region B, an increase in the driven clutch lever torque becomes slower than in the deceleration region B1. The region after the touch point TP in the driven clutch lever operating angle becomes, for example, a clutch disconnection region C in which the clutch capacity remains equivalent to "0". The clutch disconnection region C is, for example, an operation margin region for the driven clutch lever 54 and the like to operate up to the mechanical operation limit position. In the clutch disconnection region C, the driven clutch lever torque slightly increases. This increment corresponds to the increment of the clutch spring load due to the movement of the lift parts of the clutch device 26. A symbol EP in FIG. 12 indicates the full lift position which is the end point of the clutch disconnection region C.

For example, a standby position DP is set in the middle of the clutch disconnection region C. At the standby position DP, the following driven clutch lever torque is applied. The driven clutch lever torque at this time is slightly higher than the torque at the touch point TP at which the clutch device 26 starts to be connected. At the touch point TP, some torque may be transmitted due to an operation error. On the other hand, the transmission of the torque of the clutch device 26 is completely disconnected by applying the driven clutch lever torque up to the torque of the standby position DP. Further, a driven clutch lever torque slightly lower than that at the full lift position EP is applied at the standby position DP and hence the clutch device 26 can be disabled. That is, it is possible to cancel the backlash and the reaction force of each part of the clutch device 26 at the standby position DP and thus to improve the operation response when the clutch device 26 is connected.

Additionally, when the clutch device 26 is operated from the connected state to the disconnection side, the operation start position SP and the touch point TP are determined as follows. That is, the operation start position SP is a point at which the driven clutch lever torque increases (the start point of the half-clutch region B). Further, the touch point TP is a point at which the clutch device 26 is completely disconnected (the end point of the half-clutch region B).

In contrast, when the clutch device 26 is operated from the disconnected state to the connection side, the touch point TP and the operation start position SP are determined as follows. That is, the touch point TP is a point at which the clutch device 26 starts to be connected. Further, the operation start position SP is a point at which the clutch device 26 is completely connected.

Figure 13:
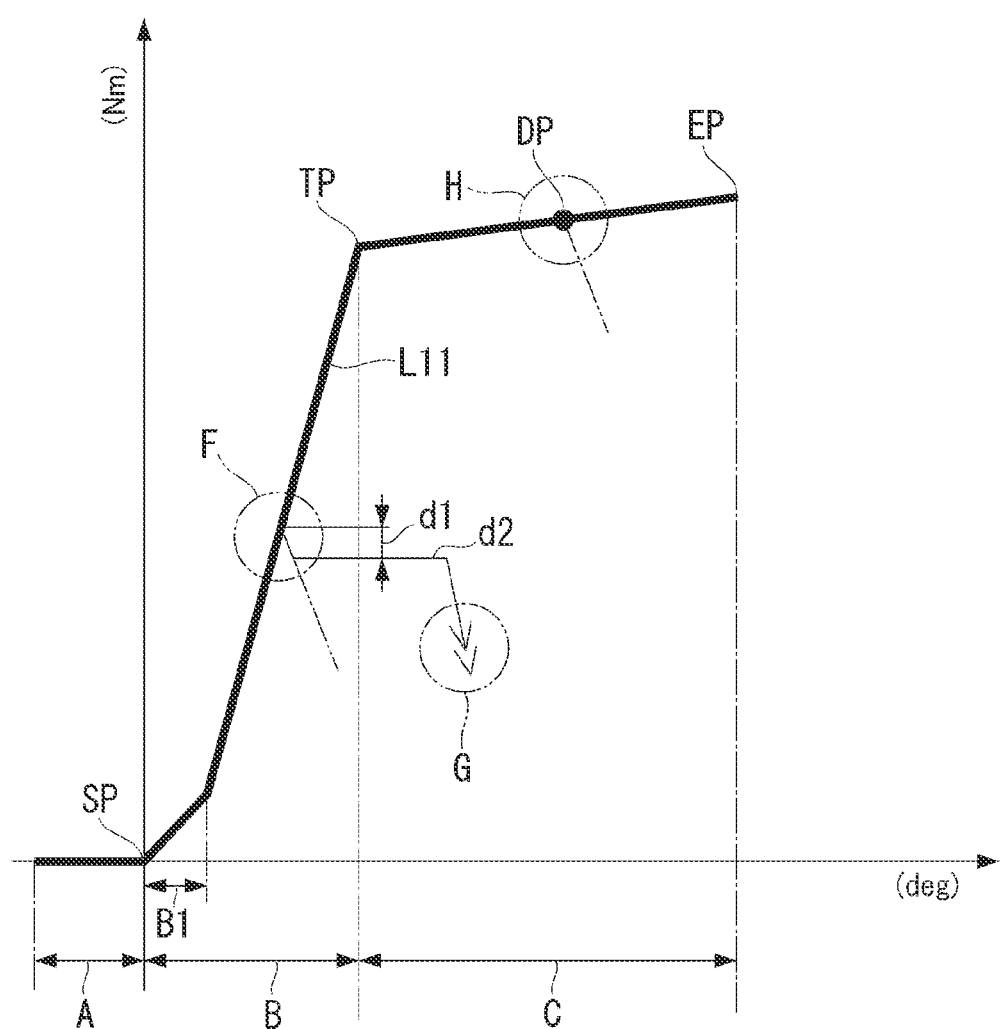
FIG. 13 is a graph corresponding to FIG. 12 and shows a first effect of the embodiment.

Referring to FIG. 13, the driving of motor 52 is controlled based on the lift load in the half-clutch region B.

In such control, the clutch spring load is first set in advance based on the elastic force of the clutch spring 37. Next, the lift load acting on the clutch device 26 (the operation load against the driven clutch spring load) is estimated according to the driven clutch lever torque. Then, the load obtained by subtracting the lift load from the clutch spring load is used as the clutch pressing load that actually acts on the clutch device 26.

The clutch capacity is obtained by "clutch pressing load/clutch spring load". The electric power supplied to the motor 52 is controlled so that the clutch capacity becomes the target value and the driven clutch lever torque and further the lift load are controlled. The motor current value and the lever operating angle at each of the operation start position SP and the touch point TP are set to predetermined values in advance. Alternatively, the motor current value and the lever operating angle are set by learning control when the power of the motorcycle 1 is turned on or off as will be described later.

An example of the sensing configuration includes the following configuration. That is, the current sensor 40*b* is provided in the motor control device (clutch control unit 40C) and the detected value is converted into motor torque and is further converted into driven clutch lever torque (clutch operating torque).

As shown in FIG. 13, when the clutch lever is operated (manually operated) in the half-clutch region B, the following effects occur. That is, the measured value of the driven clutch lever torque decreases with respect to the predetermined correlation line L11 of the driven clutch lever torque (see part F in the drawing). At this time, when the amount of decrease in the driven clutch lever torque exceeds a predetermined threshold value d1, it is determined that manual operation intervention has occurred and the control shifts to predetermined manual operation intervention control.

In the manual operation intervention control, for example, the following control is performed until the increment of the driven clutch lever operating angle becomes equal to or larger than a predetermined angle after the manual operation intervention is detected. That is, the motor 52 is feedback-controlled so that the torque d2 after the driven clutch lever torque decreases by the threshold value d1 is maintained. During the current control at this time, the current is limited according to the angle after the touch point TP. Therefore, the motor output becomes almost zero during the current control. Since the load at that time is sufficiently low, it is determined that manual intervention has occurred. Accordingly, it is possible to suppress discomfort caused by sudden loss of torque from the motor 52 after the clutch lever is operated. After the increment of the driven clutch lever operating angle reaches or exceeds a specified angle, the driven clutch lever torque is gradually decreased (see part G in the drawing). As a result, it is possible to suppress power consumption due to continuous driving of the motor 52 while suppressing the discomfort.

In the clutch disconnection region C, the driving of the motor 52 is controlled based on the lever position (angle).

As described above, in the clutch disconnection region C, an increase in the driven clutch lever torque accompanying the lift of the clutch device 26 is small. Therefore, in the clutch disconnection region C, the electric power supplied to the motor 52 is controlled based on the driven clutch lever operating angle. Accordingly, it is possible to more finely control the disconnection amount of the clutch device 26 after the touch point TP at which the clutch device 26 starts to be connected.

An example of the sensing configuration includes the following configuration. That is, the first reduction shaft 57 and the second reduction shaft 58 are respectively provided with the first rotation angle sensor 57*d* and the second rotation angle sensor 58*d*. Then, the detected values of these sensors can be converted into driven clutch lever operating angles (clutch operating angles). A pair of the first rotation angle sensor 57*d* and the second rotation angle sensor 58*d* are provided for failure, but only one of them may be provided.

As shown in FIG. 13, when the operation (manual operation) of the clutch lever intervenes in the clutch disconnection region C, the following effects occur. That is, the measured value of the driven clutch lever torque decreases with respect to the predetermined correlation line L11 of the driven clutch lever torque (see part H in the drawing).

Figure 10A:
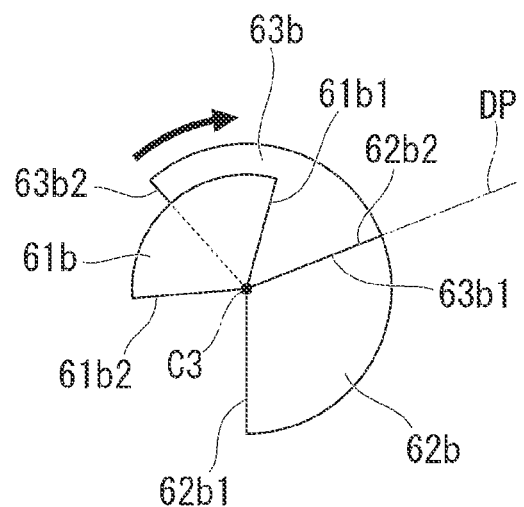
FIG. 10A is a cross-sectional view corresponding to FIG. 8 showing the action of the release shaft at a standby position and shows a driving state in the clutch actuator.
Figure 10B:
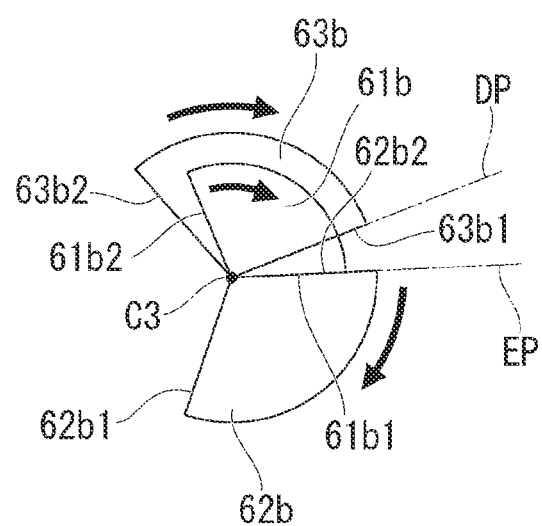
FIG. 10B is a cross-sectional view corresponding to FIG. 8 showing the action of the release shaft at the standby position and shows the manual intervention state.

Also referring to FIG. 10A, for example, in the auto mode M1, the upper limit of the torque applied by the control operation side cam 63*b* to the clutch side cam 62*b* is the torque up to the standby position DP. The torque for the clutch side cam 62*b* to reach the full lift position EP after passing the standby position DP is applied when the manual operation of gripping the clutch lever intervenes. At this time, a torque that exceeds the standby position DP is applied from the manual operation side cam 61*b* to the clutch side cam 62*b* (see FIG. 10B). At this time, the control operation side cam 63*b* is separated from the clutch side cam 62*b* and the motor output becomes substantially zero.

Even before reaching the standby position DP, if the driven clutch lever operating angle is in the clutch disconnection region C beyond the touch point TP, the following effects occur. That is, the measured value of the driven clutch lever torque becomes substantially zero due to manual intervention. Therefore, when the measured value of the driven clutch lever torque changes to substantially zero in the clutch disconnection region C, it is determined that manual intervention has occurred. Then, the control shifts to predetermined manual operation intervention control.

In the manual operation intervention control, for example, the following control is performed from when the manual operation intervention is detected until the increment of the driven clutch lever operating angle becomes equal to or larger than a predetermined angle. That is, the motor output is maintained so that the driven clutch lever operating angle maintains the touch point TP which is the substantial clutch disconnection position. Accordingly, an engine stall is suppressed even when the clutch lever is suddenly released after the manual operation intervention.

In this way, it is possible to perform more detailed clutch control (optimal control according to the state and characteristics of the clutch device 26) by selectively using load (current) control and position (angle) control according to the situation of the clutch device 26.

In the embodiment, the driven clutch lever operating angle (the rotation angle of the gear shaft of the speed reduction mechanism 51) is detected and controlled as follows. That is, the control is performed by increasing the standard of the current value in a region up to the predetermined (or learned) touch point TP (half-clutch region B). In the region after the touch point TP (clutch disconnection region C), the control was performed with an increased reference for the operating angle.

Further, in the embodiment, a change in the current value (converted to torque value) of the motor 52 with respect to the driven clutch lever operating angle is learned (updated) at a predetermined timing, and a target value is set according to the state of the clutch device 26. The driving of the motor 52 is feedback-controlled based on the target value and the detected value of the current sensor 40b of the clutch control unit 40C.

<Correction of Control Reference Value>

Figure 14:
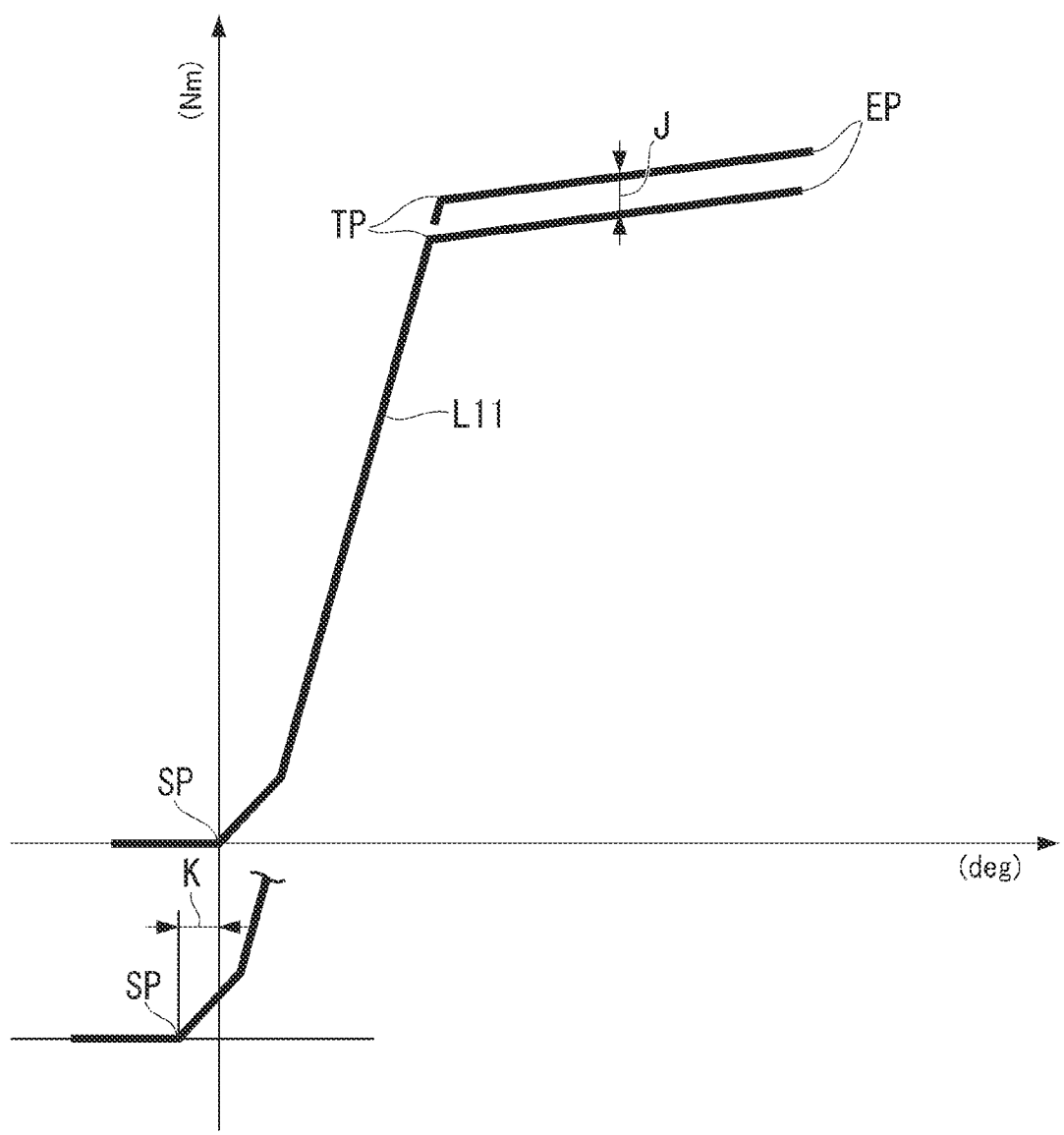
FIG. 14 is a graph corresponding to FIG. 12 and shows a second effect of the embodiment.

Next, the control for learning the current and the angle at the touch point TP and the like of the embodiment will be described with reference to the graph of FIG. 14. The graph of FIG. 14 shows a state in which the correlation line L11 indicating the clutch characteristics shown in FIGS. 12 and 13 changes according to the wear of the clutch plate 35 and the temperature of the engine 13 (for example, coolant temperature). In FIG. 14, the vertical axis indicates the driven clutch lever torque (Nm) and the horizontal axis indicates the driven clutch lever operating angle (deg).

In the embodiment, for example, when the main switch (power supply) of the motorcycle 1 is turned on or off, the zero point (the operation start position SP and the touch point TP) in clutch capacity control is corrected. In the current control of the motor 52, the temperature changes affect the motor torque and hence the height of the correlation line L11 changes depending on the temperature (see J in the drawing). Therefore, for example, the zero point correction is performed in each of a plurality of temperature ranges such as whether or not the engine temperature is 80° or higher (whether or not the engine has been warmed up). The zero point at this time is stored in the memory and is used for the next clutch capacity control.

An example of the procedure for setting (learning) the operation start position SP and the touch point TP will be described. First, for example, the clutch actuator 50 is operated when the power of the clutch control unit 40C is turned on or off. At this time, a change in current value until the clutch device 26 is disconnected is measured. Next, the inclination (change rate) of change in the current value from the play region A to the half-clutch region B is detected. Further, the inclination (change rate) of change in the current value from the half-clutch region B to the clutch disconnection region C is detected. A point at which the former inclination is equal to or larger than the threshold value is referred to as the operation start position SP. A point at which the latter inclination is equal to or smaller than the threshold value is referred to as the touch point TP.

Alternatively, the following part may be learned as the operation start position SP. This part is a part in which a current is ramped up from the clutch play region and the angular velocity of the rotation angle sensor accelerates and then decelerates (maximum velocity).

In contrast, the following part may be learned as the touch point TP. This part is a part in which a current is ramped down from the clutch disconnected state (maintained in the region) and the angular velocity of the rotation angle sensor accelerates and then decelerates (maximum velocity).

Also, it is determined whether or not the driven clutch lever operating angle has decreased by a specified value or more at the same timing as above. If the driven clutch lever operating angle is greatly reduced, there is a possibility that the clutch plate 35 wears.

That is, in the normally closed clutch, when the clutch plate 35 wears, the lifter shaft 39 moves away from the release mechanism 38. Accordingly, when the clutch plate 35 wears, the play of the release mechanism 38 decreases. Accordingly, the release shaft 53 operates the clutch device 26 to the disconnection side with a small operating angle. Accordingly, the driven clutch lever operating angle decreases at the operation start position SP in which the play region A is switched to the half-clutch region B (see K in the drawing). Thus, when the driven clutch lever operation angle at the operation start position SP has decreased to a specified value or more, it is possible to predict that the clutch plates 35 wear. When the wear of the clutch plate 35 is predicted (detected), the user can be warned using an indicator 40d (see FIG. 3) provided in a meter device or the like.

The motor current and the lever operating angle at the touch point TP and the like are learned whenever the motorcycle 1 is turned on or off. Accordingly, it is possible to perform control using the touch point TP and the like with high accuracy. Further, it is also possible to predict (detect) wear of the clutch plate 35.

From the relationship between the lever operating angle and the motor current, the motor current and the lever operating angle at the touch point TP at which the clutch device 26 starts to be connected are learned. Accordingly, it is possible to perform clutch control based on the effects of friction, wear, and temperature.

<Estimation of Motor Temperature>

In the embodiment, the temperatures of the motors 521 and 522 of the clutch actuator 50 are estimated, for example, while the motorcycle 1 is traveling (the clutch is connected). Specifically, the resistance value of at least one of the motors 521 and 522 is detected (calculated) and the motor temperature is estimated from this resistance value.

Figure 18:
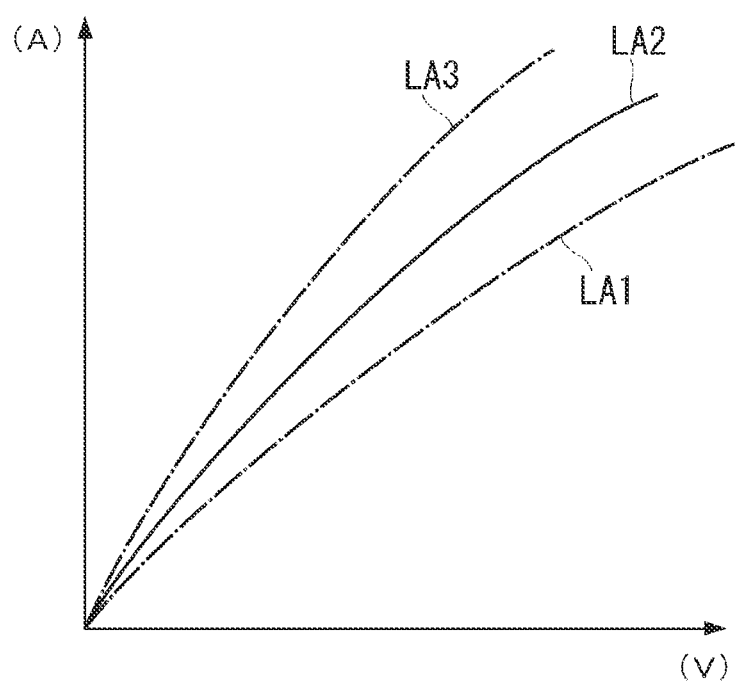
FIG. 18 is a graph showing a correlation line between a current and a voltage supplied to a motor of the clutch actuator for each temperature of the motor.

The graph in FIG. 18 shows the correlation between the current and the voltage supplied to each of the motors 521 and 522. The vertical axis indicates the current (A) and the horizontal axis indicates the voltage (V).

Lines LA1, LA2, and LA3 in the drawing respectively indicate correlation lines for motor temperatures of 50° C., 25° C., and 0° C. The inclinations of the correlation lines LA1, LA2, and LA3 correspond to the resistance values of the motors 521 and 522. When the motor temperature increases, the resistance value of each of the motors 521 and 522 increases. When the motor temperature decreases, the resistance value of each of the motors 521 and 522 decreases. That is, the inclinations of the correlation lines LA1, LA2, and LA3 change according to the motor temperature.

In the embodiment, each of the motors 521 and 522 is driven at an arbitrary timing to detect a current and a voltage. Also, the resistance value and the temperature of each of the motors 521 and 522 are estimated from the result. For example, the relationship between the resistance value and the temperature is stored in the control unit 40 in advance. The above-described relationship is approximated in a tabular form or mathematical expression based on resistance specifications or actual measurements.

Examples of methods for driving the motors 521 and 522 and detecting the current and the voltage include the following. That is, the motors 521 and 522 are reversely driven in the clutch connected state while the vehicle is traveling. Each of the motors 521 and 522 meshes with a common transmission element (the first reduction gear 57a of the speed reduction mechanism 51). Therefore, when the motors 521 and 522 are reversely driven, the current and the voltage corresponding to the loads of the motors 521 and 522 can be detected without operating the transmission mechanism 51 and the clutch device 26. From the result, the resistance value and the temperature of each of the motors 521 and 522 can be estimated.

Referring to FIG. 5, the motors 521 and 522 are the same parts, and are arranged with their axes parallel to each other. The motors 521 and 522 are arranged at the same axial position. The drive gear 55a is provided integrally with the drive shaft 55 of each of the motors 521 and 522. Each drive gear 55a is at the same axial position. Each drive gear 55a meshes with a single spur gear (first reduction gear 57a) (see FIG. 6). The motors 521 and 522 are arranged to be adjacent to each other in the radial direction. There are no other parts between the motors 521 and 522. The separation distance K1 between the motors 521 and 522 is smaller than the diameter K2 of the motor body portion. Therefore, it can be said that the motors 521 and 522 are close to each other.

By arranging these motors 521 and 522, it is possible to more accurately estimate the motor temperature. That is, even if the motors 521 and 522 are driven with the same current, the motor temperatures may vary due to individual differences and arrangement of the motors 521 and 522. On the other hand, since heat conduction occurs between the motors 521 and 522 that are close to each other, they are susceptible to mutual thermal effects. Therefore, it is possible to estimate the motor temperature closer to the actual machine by arranging the motors 521 and 522 close to each other, estimating the respective temperatures, and obtaining an average value thereof.

Referring to FIG. 18, the control unit 40 determines the current to be supplied to each of the motors 521 and 522 according to the motor temperature estimated by the above-described method. In other words, the control unit 40 performs correction according to the estimated motor temperature for current values (corresponding to the correlation line LA2 (reference current line)) supplied to the motors 521 and 522 under a reference temperature (for example, 25° C.). Accordingly, the current value supplied to each of the motors 521 and 522 is determined under the estimated motor temperature. For example, if the estimated motor temperature is lower than the reference temperature, the current value is closer to the correlation line LA3 (equivalent to 0° C.). If the estimated motor temperature is higher than the reference temperature, the current value is closer to the correlation line LA1 (equivalent to 50° C.). The control unit 40 may individually set the current supplied to each of the motors 521 and 522. The control unit 40 reduces the control load by controlling the motors 521 and 522 with a common current.

The control unit 40 operates the ignition device 47, the fuel injection device 48, and the like based on the detection information of the throttle opening degree sensor 44, the engine rotation speed sensor 46, and the like. Accordingly, the control unit 40 controls the driving (output) of the engine 13. The intake air amount and the intake air temperature are also used for engine control by the control unit 40. An intake air temperature sensor (outside air temperature sensor) (not shown) is used to detect the intake air temperature.

If the intake air temperature sensor fails, this failure affects the control of the fuel injection amount and hence a configuration for detecting the failure of the intake air temperature sensor is desired.

In the embodiment, the temperature estimation of each of the motors 521 and 522 is used to detect the failure of the intake air temperature sensor.

Specifically, in the embodiment, the following comparison is performed when a predetermined time has elapsed since the control unit 40 was stopped (the power was turned off). This comparison is a comparison between the temperature estimated value of each of the motors 521 and 522 and the detected value of the intake air temperature sensor. It is considered that the temperature of each of the motors 521 and 522 becomes equal to the outside air temperature after the predetermined time has elapsed. In this case, the comparison is performed when the control unit 40 is started (power is turned on). In this comparison, if the difference between the two values is equal to or larger than the threshold value, it is determined that the intake air temperature sensor has failed (or the control unit 40 has failed).

Hereinafter, the process of detecting the failure of the intake air temperature sensor using the temperature estimation of the motors 521 and 522 in the control unit 40 will be described with reference to the flowchart of FIG. 19. This process starts when the power of the control unit 40 is turned on (the main switch of the motorcycle 1 is turned on).

First, in step S1, it is determined whether or not the starting (power is turned on) of the control unit 40 has been stopped for a predetermined time (for example, 12 hours) or more. For example, step S1 corresponds to determination on whether or not a predetermined time has elapsed since the control unit 40 was stopped last time (the power was turned off).

If YES in step S1 (predetermined time elapsed), the process proceeds to step S2. In step S2, as described above, the motors 521 and 522 are reversely driven, the current and the voltage are detected, and the temperatures of the motors 521 and 522 are estimated. Additionally, the result of step S1 is YES also when the control unit 40 is first started in a new product state, a replacing state, or a resetting state. If NO (within the predetermined time) in step S1, the temperatures of the motors 521 and 522 are not equal to the outside air temperature, and the intake air temperature sensor failure determination is not possible. As a result, the process ends.

Further, in step S3, the outside air temperature information detected by the intake air temperature sensor is acquired in conjunction with step S2. Further, in step S4, the motor temperature estimated in step S2 is compared with the outside air temperature acquired in step S3. Then, in step S5, it is determined whether or not the temperature difference between the motor temperature and the outside air temperature compared in step S4 is equal to or larger than a predetermined threshold value.

If YES in step S5 (the temperature difference is equal to or larger than the threshold value), it is determined that there is a failure of the intake air temperature sensor (or a failure of the control unit 40) (step S6). At this time, an indicator or the like is used to notify the user of the abnormality (step S7). If NO (the temperature difference is smaller than the threshold value) in step S5, it is determined that there is no abnormality in the intake air temperature sensor and the control unit 40, and the process ends.

As described above, the clutch control apparatus 40A of the above-described embodiment includes the clutch device 26 which enables and disables the transmission of power between the engine 13 and the transmission 21, the clutch actuator 50 which outputs a driving force for operating the clutch device 26, and the control unit 40 which controls the driving of the clutch actuator 50. The clutch actuator 50 includes the plurality of motors 521 and 522 which output the driving force and the speed reduction mechanism 51 which is disposed between the plurality of motors 521 and 522 and the clutch device 26. The plurality of motors 521 and 522 are able to input a driving force to a common transmission element (first reduction gear 57a) of the speed reduction mechanism 51. The control unit 40 detects the resistance values of the plurality of motors 521 and 522 without driving the common transmission element by reversely driving the plurality of (pair of) motors 521 and 522. The control unit 40 estimates the motor temperatures of the motors 521 and 522 from the resistance values and controls the driving of the motors 521 and 522 according to the motor temperatures.

According to this configuration, since the temperature is estimated by detecting the resistance value of the drive source (electric motor 52) of the clutch actuator 50, the following effects can be obtained compared to the case of providing a separate temperature sensor. That is, it is possible to control the motor according to the motor temperature while keeping down the cost of parts. Therefore, it is possible to realize appropriate clutch control in consideration of the motor temperature. In addition, since the resistance values are detected by mutually driving the motors 521 and 522 in reverse, the speed reduction mechanism 51 is not operated. Thus, the operating state of the clutch device 26 is not affected. Therefore, it is possible to estimate the resistance value and the temperature of the motor 52 at an arbitrary timing. Additionally, the resistance value and the temperature may be estimated by one of the motors 521 and 522.

Further, in the clutch control apparatus, the plurality of motors 521 and 522 are arranged to be adjacent to each other.

According to this configuration, the resistance values of the plurality of electric motors 521 and 522 arranged to be adjacent (close) to each other are detected. Accordingly, it is possible to more accurately estimate the motor temperature.

Further, in the clutch control apparatus, the average value of the motor temperatures is obtained based on the resistance values of the plurality of motors 521 and 522 and the driving of the plurality of motors 521 and 522 is controlled according to the average value.

According to this configuration, the average value of the motor temperatures estimated from the resistance values of the electric motors 521 and 522 is used. Therefore, it is possible to suppress the influence of temperature variations due to the individual differences and arrangement of the electric motors 521 and 522 and to more accurately estimate the motor temperature.

Further, in the clutch control apparatus, the current values of the plurality of motors 521 and 522 are corrected according to the motor temperatures estimated from the resistance values.

According to this configuration, it is possible to perform appropriate motor control according to changes in motor temperature. That is, when the motor temperature increases, the resistance value increases and the magnetic force decreases. The current supplied to each of the electric motors 521 and 522 is controlled according to this change. As a result, the driving performance of the electric motors 521 and 522 can be kept satisfactory and appropriate clutch control can be realized.

Further, in the clutch control apparatus, when the control unit 40 is restarted after being stopped for a predetermined time (for example, 12 hours), the following control is performed. That is, the control unit 40 detects the resistance values of the plurality of motors 521 and 522 and estimates the motor temperature. The control unit 40 compares the motor temperature with the outside air temperature (intake air temperature) detected by the intake air temperature sensor. If the difference between these temperatures is equal to or larger than a predetermined threshold value, it is determined that the intake air temperature sensor is abnormal.

According to this configuration, the failure of the intake air temperature sensor can be detected. This detection is made by using the fact that the temperature of the motor of the clutch actuator 50 becomes equal to the ambient temperature after the clutch control system is stopped for a predetermined time. That is, when the system is started after a predetermined time has elapsed, the motor temperature is estimated and the outside air temperature is acquired from the intake air temperature sensor. The failure of the intake air temperature sensor can be detected by comparing the motor temperature and the outside air temperature. Additionally, it can also be applied to failure determination when the outside air temperature sensor is provided in addition to the intake air temperature sensor. Further, the motor temperature may be estimated by estimating the temperature of one of the motors 521 and 522.

Additionally, the present invention is not limited to the above-described embodiment. For example, the clutch operator is not limited to a clutch lever, and may be a clutch pedal or other various operators. The clutch device is not limited to being arranged between the engine and the transmission and may be arranged between the prime mover and any output object other than the transmission. The prime mover is not limited to an internal combustion engine, and may be an electric motor.

The application is not limited to the saddle type vehicle in which the clutch operation is automated as in the above-described embodiment. For example, the present invention is also applicable to the saddle type vehicle which allows gear shifting by adjusting the driving force without a manual clutch operation under specified conditions based on the manual clutch operation (a so-called saddle type vehicle equipped with a transmission that does not require a clutch operation).

Further, the saddle type vehicle includes all vehicles in which the driver straddles the vehicle body and includes not only motorcycles (including motorized bicycles and scooter type vehicles), but also three-wheeled vehicles (including vehicles with one front wheel and two rear wheels as well as vehicles with two front wheels and one rear wheel) or four-wheeled vehicles. Also, the saddle type vehicle includes vehicles having an electric motor in the prime mover.

Then, the configuration of the above-described embodiment is an example of the present invention and can be modified into various forms without departing from the gist of the present invention.

REFERENCE SIGNS LIST

1 Motorcycle (saddle type vehicle)
13 Engine (prime mover)
21 Transmission (output object)
26 Clutch device
40 Control unit
40A Clutch control apparatus
50 Clutch actuator
51 Speed reduction mechanism (transmission mechanism)
52, 521, 522 Electric motor (drive source)

What is claimed is:

1. A clutch control apparatus comprising:
a clutch device which enables and disables the transmission of power between a prime mover and an output object;
a clutch actuator which outputs a driving force for operating the clutch device; and
a control unit which controls the driving of the clutch actuator,
wherein the clutch actuator includes a plurality of electric motors which output the driving force and a transmission mechanism which is disposed between the plurality of electric motors and the clutch device,
wherein the plurality of electric motors are able to input a driving force to a common transmission element in the transmission mechanism,
wherein the control unit detects at least one resistance value of the plurality of electric motors by inputting a first driving force of a part of the plurality of electric motors and inputting a second driving force of remaining electric motors not so as to move the common transmission element, the first driving force and the second driving force being in a direction opposite to each other, and
wherein the control unit estimates a motor temperature from the resistance value and controls the driving of the plurality of electric motors according to the motor temperature.

2. The clutch control apparatus according to claim 1, wherein the plurality of electric motors are adjacent to each other.

3. The clutch control apparatus according to claim 1, wherein an average value of the motor temperatures is obtained based on the resistance values of the plurality of electric motors and the driving of the plurality of electric motors is controlled according to the average value.

4. The clutch control apparatus according to claim 1, wherein current values of the plurality of electric motors are corrected according to the motor temperatures estimated from the resistance values.

5. The clutch control apparatus according to claim 1, wherein when the control unit is started after being stopped for a predetermined time or more, the control unit detects at least one resistance value of the plurality of electric motors and estimates the motor temperature and the control unit compares the motor temperature with an outside air temperature detected by an outside air temperature sensor and determines that the outside air temperature sensor is abnormal if a temperature difference is equal to or larger than a predetermined threshold value.

* * * * *